US012643557B1

(12) United States Patent
Voroninski et al.

(10) Patent No.: US 12,643,557 B1
(45) Date of Patent: Jun. 2, 2026

(54) ROAD SURFACE DETECTION AND PREDICTION SYSTEM FOR VEHICLE SAFETY AND PERFORMANCE ENHANCEMENT

(71) Applicant: Helm.ai, Inc., Menlo Park, CA (US)

(72) Inventors: Vladislav Voroninski, Redwood City, CA (US); Michael Anthony Viscardi, Redwood City, CA (US); Tobias Constantin Wessels, San Jose, CA (US)

(73) Assignee: Helm.ai, Inc., Redwood City, CA (US)

( * ) Notice: Subject to any disclaimer, the term of this patent is extended or adjusted under 35 U.S.C. 154(b) by 0 days.

(21) Appl. No.: 19/236,412

(22) Filed: Jun. 12, 2025

Related U.S. Application Data

(60) Provisional application No. 63/660,316, filed on Jun. 14, 2024.

(51) Int. Cl.
| | |
|---|---|
| B60W 50/00 | (2006.01) |
| G06V 10/82 | (2022.01) |
| G06V 20/56 | (2022.01) |

(52) U.S. Cl.
CPC .... B60W 50/0098 (2013.01); B60W 50/0097 (2013.01); G06V 10/82 (2022.01); G06V 20/588 (2022.01); B60W 2420/403 (2013.01); B60W 2520/105 (2013.01); B60W 2520/26 (2013.01); B60W 2530/20 (2013.01)

(58) Field of Classification Search
CPC ........... B60W 40/068; B60W 2552/40; B60W 40/06; B60W 2530/20; B60T 8/1725; B60T 2210/12
See application file for complete search history.

(56) References Cited

U.S. PATENT DOCUMENTS

| | | | |
|---|---|---|---|
| 9,296,263 B2 * | 3/2016 | Muthukumar | ............ B60T 1/10 |
| 2016/0305785 A1 | 10/2016 | Nishijima | |
| 2019/0251370 A1 * | 8/2019 | Askeland | ............... G06V 20/56 |
| 2023/0042735 A1 * | 2/2023 | Gaudin | ................... B60T 8/172 |

OTHER PUBLICATIONS

Road Surface Status Classification Using Spectral Analysis of NIR Camera Images to Jonsson et al. (John) pp. 1641-1656, IEEE Sensors Journal, vol. 15, No. 3, Mar. 2015, available at: https://ieeexplore.ieee.org/document/6936308 (Year: 2015).*

* cited by examiner

*Primary Examiner* — Kenneth J Malkowski
(74) *Attorney, Agent, or Firm* — Van Pelt, Yi & James LLP

(57) ABSTRACT

Adaptive road surface detection and safety feature activation includes receiving an image captured by a camera, the image comprising a road surface ahead of a vehicle. It further includes providing the image to an image-based road surface condition prediction model that is trained at least in part using physically-sensed traction data. It further includes pre-emptively activating one or more safety-related features of the vehicle based at least in part on an anticipated condition of the road surface predicted by the image-based road surface condition prediction model.

16 Claims, 7 Drawing Sheets

Figure 3:
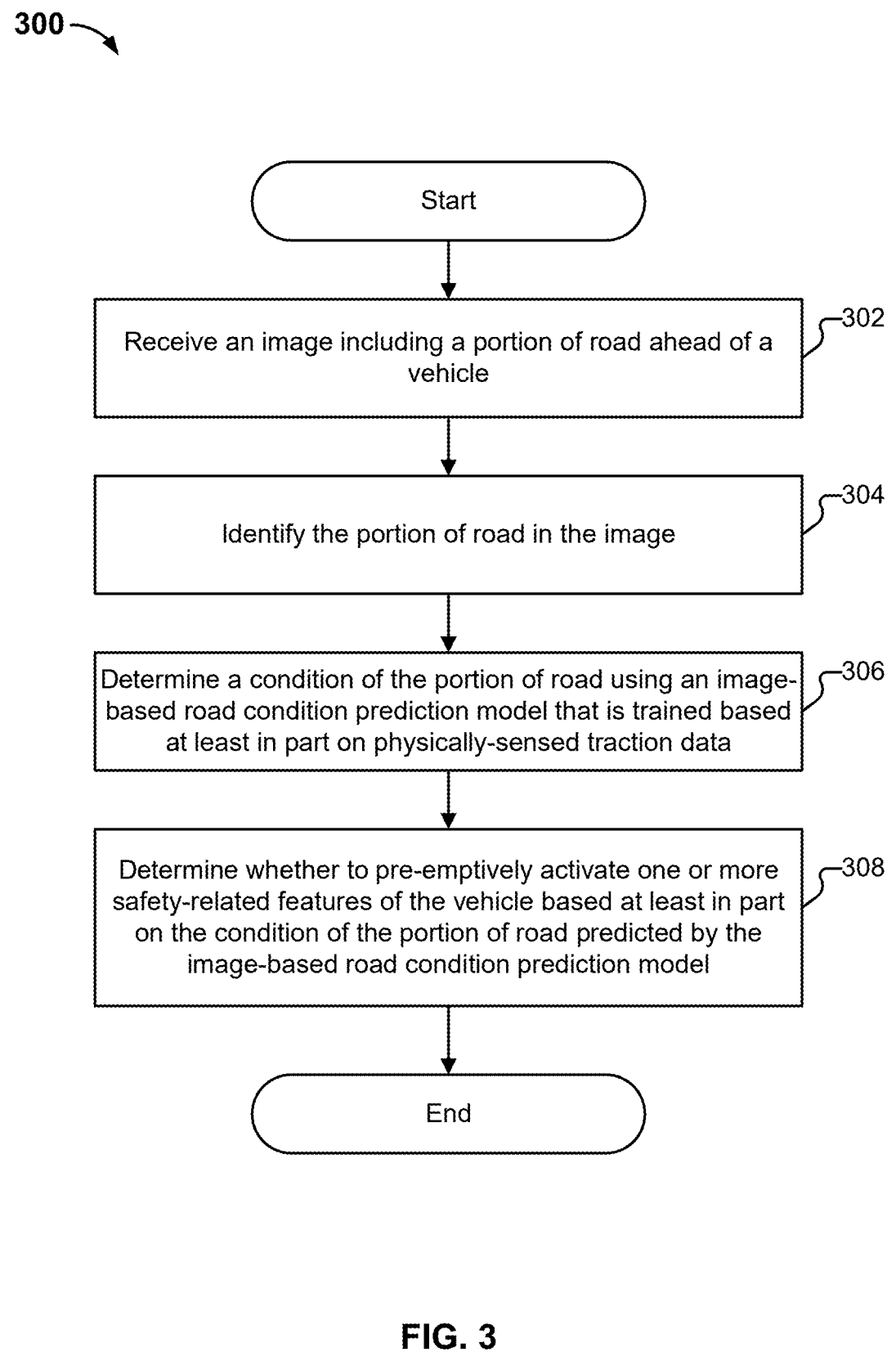

300

Start

Receive an image including a portion of road ahead of a vehicle ⌐302

Identify the portion of road in the image ⌐304

Determine a condition of the portion of road using an image-based road condition prediction model that is trained based at least in part on physically-sensed traction data ⌐306

Determine whether to pre-emptively activate one or more safety-related features of the vehicle based at least in part on the condition of the portion of road predicted by the image-based road condition prediction model ⌐308

End

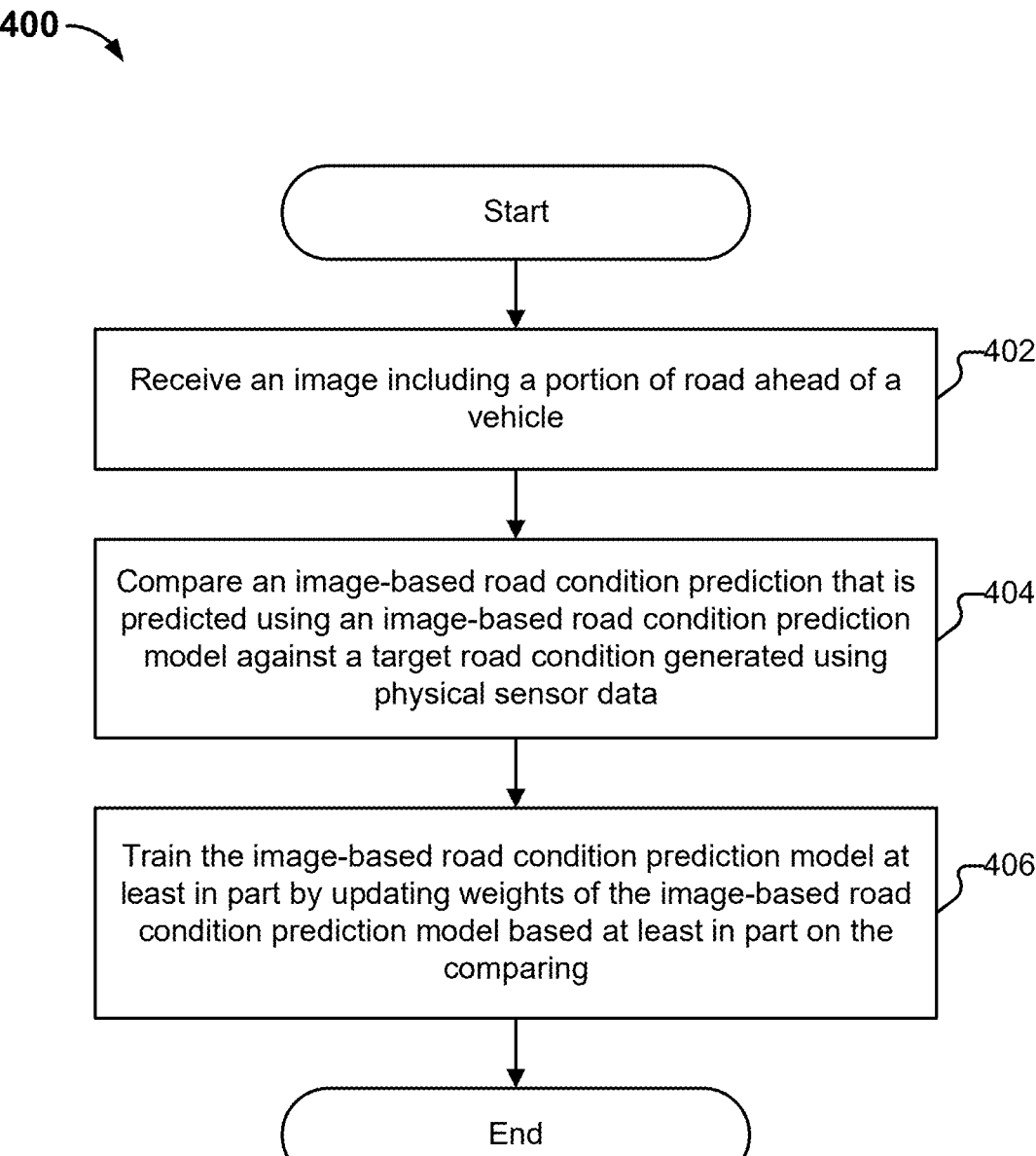

Start

Receive an image including a portion of road ahead of a vehicle ⟍402

Compare an image-based road condition prediction that is predicted using an image-based road condition prediction model against a target road condition generated using physical sensor data ⟍404

Train the image-based road condition prediction model at least in part by updating weights of the image-based road condition prediction model based at least in part on the comparing ⟍406

End

Start

Detect tire slippage that is different from what was anticipated by an image-based road condition prediction model — 602

In response to detecting tire slippage that is different to what was anticipated by the image-based road condition prediction model, transmit an activation threshold adjustment signal — 604

End

650

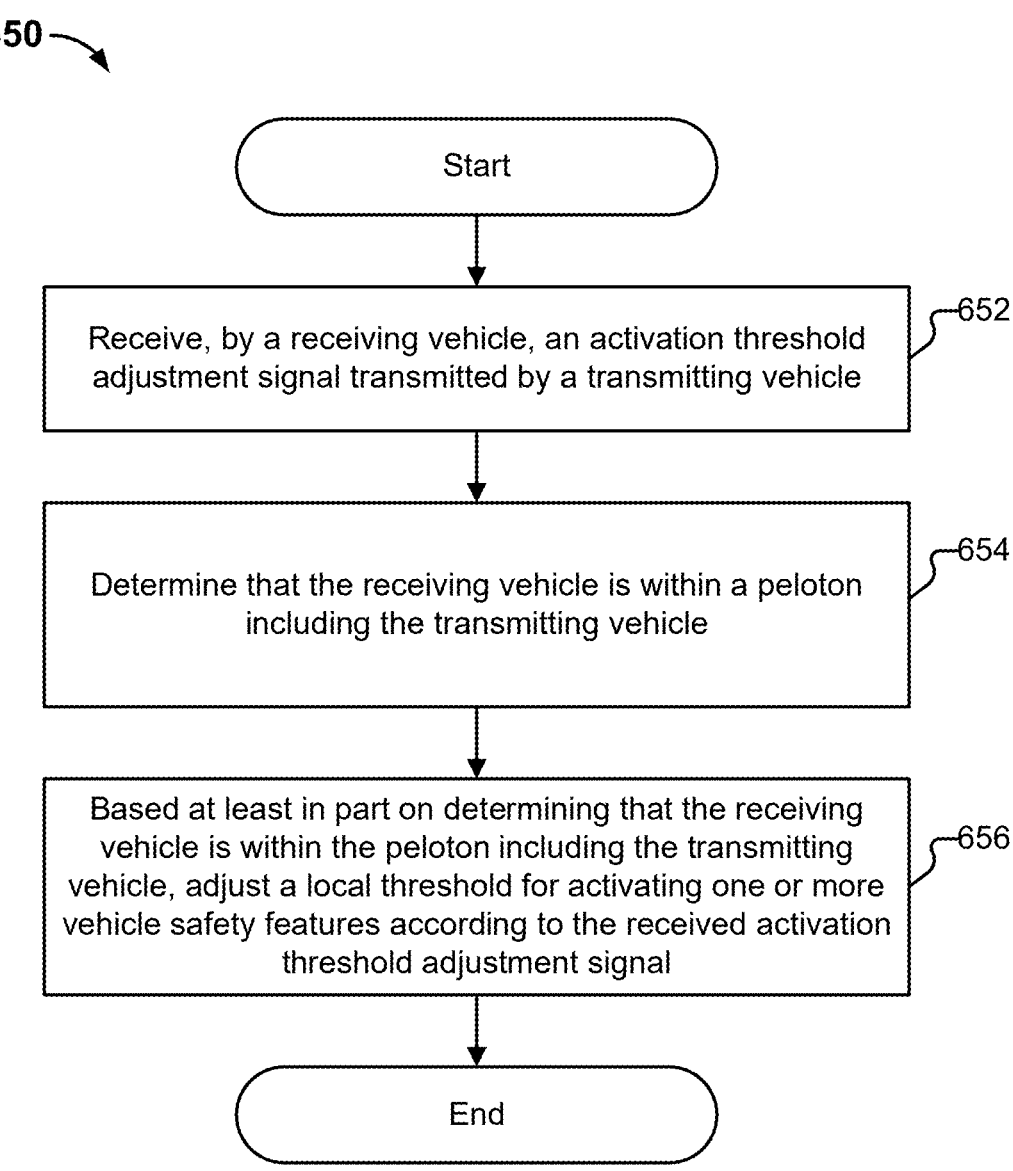

```
         ┌─────────────────────┐
         │        Start        │
         └─────────────────────┘
                    │
                    ▼
  ┌──────────────────────────────────────┐
  │ Receive, by a receiving vehicle, an   │── 652
  │ activation threshold adjustment signal │
  │ transmitted by a transmitting vehicle  │
  └──────────────────────────────────────┘
                    │
                    ▼
  ┌──────────────────────────────────────┐
  │ Determine that the receiving vehicle  │── 654
  │ is within a peloton including the      │
  │ transmitting vehicle                   │
  └──────────────────────────────────────┘
                    │
                    ▼
  ┌──────────────────────────────────────┐
  │ Based at least in part on determining  │
  │ that the receiving vehicle is within   │── 656
  │ the peloton including the transmitting │
  │ vehicle, adjust a local threshold for   │
  │ activating one or more vehicle safety  │
  │ features according to the received      │
  │ activation threshold adjustment signal  │
  └──────────────────────────────────────┘
                    │
                    ▼
         ┌─────────────────────┐
         │         End         │
         └─────────────────────┘
```

FIG. 6B

ROAD SURFACE DETECTION AND PREDICTION SYSTEM FOR VEHICLE SAFETY AND PERFORMANCE ENHANCEMENT

CROSS REFERENCE TO OTHER APPLICATIONS

This application claims priority to U.S. Provisional Patent Application No. 63/660,316 entitled ROAD SURFACE DETECTION AND PREDICTION SYSTEM FOR VEHICLE SAFETY AND PERFORMANCE ENHANCEMENT filed Jun. 14, 2024 which is incorporated herein by reference for all purposes.

BACKGROUND OF THE INVENTION

Traction loss between a vehicle and a road surface can lead to adverse events such as vehicular accidents. Improvements to the accuracy and speed at which such situations are handled would be beneficial to enhance safety and performance.

BRIEF DESCRIPTION OF THE DRA WINGS

Various embodiments of the invention are disclosed in the following detailed description and the accompanying drawings.

FIG. 3 is a flow diagram illustrating an embodiment of a process for adaptive road surface detection and safety feature activation.

FIG. 4 is a flow diagram illustrating an embodiment of a process for training an image-based road surface condition prediction model using physically-sensed traction data.

FIG. 6B is a flow diagram illustrating an embodiment of a process for determining whether to accept a received activation threshold adjustment signal.

DETAILED DESCRIPTION

Figure 1:
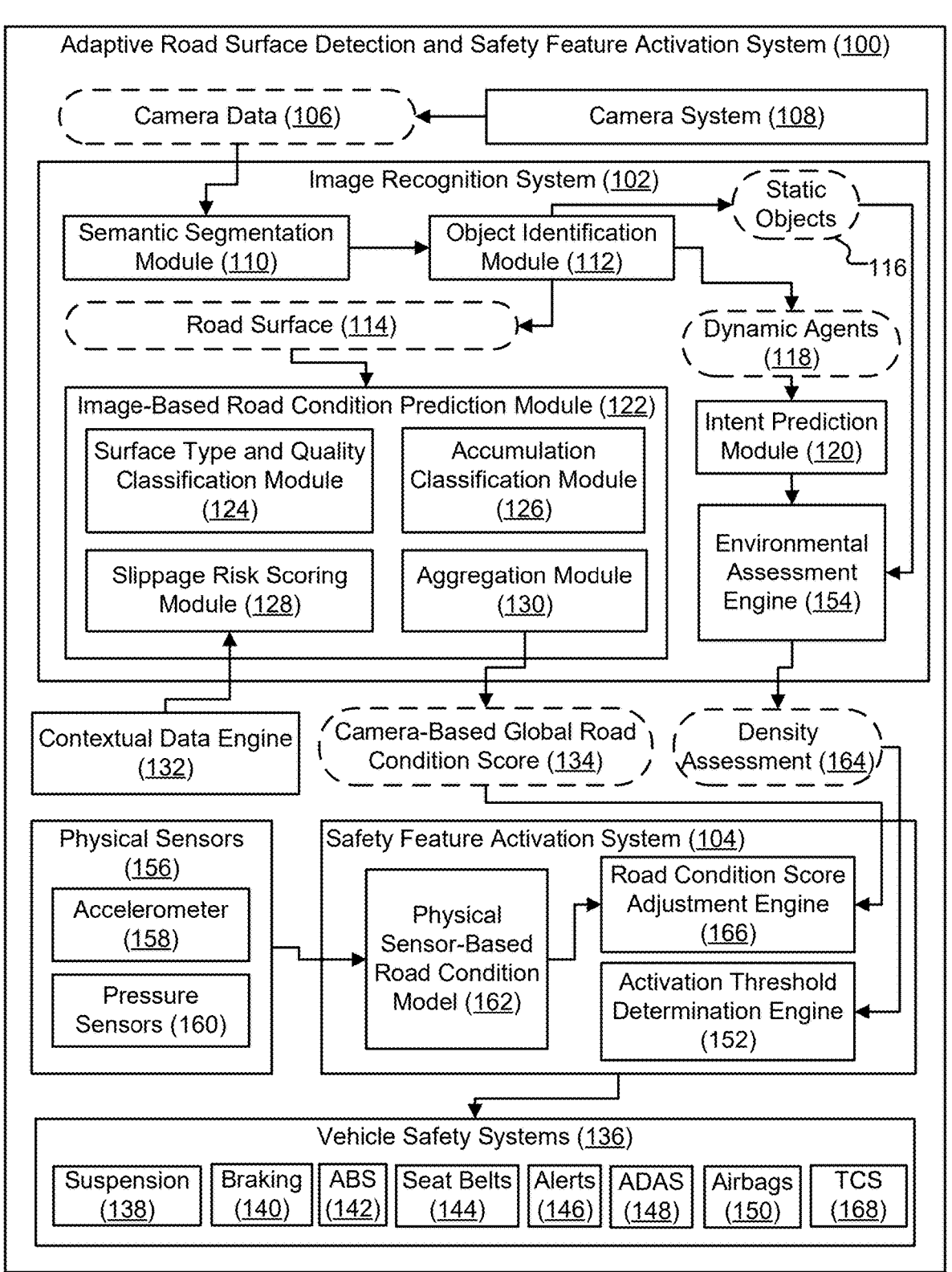
FIG. 1 illustrates an embodiment of an adaptive road surface detection and safety feature activation system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the context of vehicles moving over a road, traction refers to the amount of grip or friction between the tires of the moving vehicle and the road surface. The amount of traction between the road and the tire is dependent on a variety of factors including road surface conditions and tire conditions. A loss of traction can result in tire slippage, which can in turn lead to loss of vehicle control and adverse events, such as vehicular accidents.

The following are embodiments of an adaptive road surface detection and safety activation system using semantic segmentation and micro-pressure-based slippage sensing. Embodiments of the techniques described herein include road surface detection for vehicles, including using multimodal sensors such as, without limitation, video cameras, accelerometers, and tire-integrated micro-pressure sensors to perform real-time semantic segmentation of road environments and to determine dynamic thresholds for vehicle safety system activation based on probabilistic slippage detection.

Autonomous and assisted driving systems rely on accurate environmental understanding to ensure safety. A significant challenge with existing systems arises in real-time identification of road conditions such as rain, ice, or snow that affect traction. Existing systems may use cameras, radar, LIDAR (Light Detection and Ranging), etc., but often lack adaptive feedback loops to confirm and calibrate predictions based on actual traction data. Further, existing safety systems are reactive, only activating after traction loss has actually been detected.

For example, conventional vehicle safety and performance systems react to road surface conditions only after the vehicle's tires have made contact, leading to potential delays in response time and reduced effectiveness in preventing accidents or optimizing vehicle performance. Anticipating road surface conditions before tire contact would facilitate proactive or pre-emptive activation of safety and performance systems, thereby enhancing overall vehicle safety and performance.

Described herein are embodiments of a road surface detection and prediction system that anticipates road conditions ahead of the vehicle's current position. In various embodiments, by leveraging camera and/or sensor input and employing object recognition algorithms, the system identifies and predicts road surface conditions before tire contact (e.g., milliseconds before). Embodiments of such predictive capability facilitate the proactive activation of vehicle driving or safety systems, enhancing safety and performance.

Embodiments of the techniques described herein improve upon existing systems by, for example, integrating tire-sensed data, such as pressure variations across contact patches, as well as other physical sensor data (e.g., inertial measurement data from accelerometers), in order to identify and anticipate road conditions that affect traction. As will be described in further detail below, such physically-sensed traction data is utilized for pixel-like resolution of road surface friction/traction estimation. The use of such data fills gaps in existing autonomous and assisted driving systems, and improves safety.

As will be described in further detail below, embodiments of the techniques described herein include visual or image-based prediction of road conditions that affect traction using a model trained using physical sensor data (also referred to herein as physically-sensed traction data). Embodiments of the techniques described herein predict or anticipate the likelihood of upcoming traction reduction (e.g., tire slippage) based on evaluation of images captured of the road ahead of a moving vehicle (e.g., via analysis of forward vision or camera feeds). Using such a forward-looking prediction, vehicle systems (such as safety systems) can be proactively engaged prior to, and in anticipation of, slippage actually occurring, rather than reactively (e.g., only after traction reduction such as tire slippage has been detected). Such pre-emptive activation of vehicle systems is an improvement over existing safety systems. For example, such pre-emptive activation allows for more time to prevent adverse events in a manner that is also more unobtrusive and does not startle or disrupt the driver.

The techniques described herein provide various benefits and advantages. For example, the techniques described herein provided enhanced safety by proactively activating safety systems based on predicted road surface conditions, reducing the risk of accidents and improving overall vehicle safety. As another example benefit, the techniques described herein provide improved performance. For example, anticipating road surface conditions allows for preemptive adjustment of vehicle driving parameters, optimizing performance in various driving conditions. As another example benefit, the techniques described herein provide improved response time. For example, by predicting road surface conditions before tire contact (e.g., milliseconds before), the system minimizes response time and maximizes the effectiveness of activated vehicle systems.

Embodiments of the road surface detection and prediction system described herein represent a significant advancement in vehicle safety and performance technology. In various embodiments, by anticipating road surface conditions ahead of the vehicle's current position and activating driving or safety systems proactively, the system described herein enhances safety, performance, and driver confidence.

In some embodiments, an adaptive road surface detection and safety activation system includes:

a camera sensor system that captures images ahead of a direction of travel of an ego vehicle.

an image recognition system that performs real-time semantic segmentation of a road surface identified in images/video captured by the camera sensor system.

a scoring module that assigns a slippage risk score (e.g., on a 1-10 scale) to each pixel classified as road surface. In various embodiments, the classification is based on various features such as environmental features and surface type.

tire-embedded micro-pressure sensors. As will be described in further details below, in some embodiments, pressure data is also utilized. For example, a vehicle is equipped with tire-embedded micro-pressure sensors. In some embodiments, such pressure sensors detect fine pressure variations across a tire's contact patch with the road, in a manner analogous to pixels.

an accelerometer-based feedback loop. In some embodiments, accelerometer data is also utilized. In some embodiments, the adaptive road surface detection and safety activation systems described herein include an accelerometer-based feedback loop that correlates actual slippage (as measured using accelerometer data) with (camera) sensor-based predictions a dynamic activation threshold module that is configured to adjust the triggering of vehicle safety systems such as ABS (Antilock Braking System), traction control, and/or other vehicle safety systems based on both predicted (e.g., from the image) and observed (e.g., measured from physical sensors such as pressure sensors and accelerometers) slippage (or other types of traction reduction).

FIG. 1 illustrates an embodiment of an adaptive road surface detection and safety feature activation system. As will be described in further detail below, embodiments of the system described herein perform image-based road surface condition detection of the road surface ahead of a traveling vehicle. For example, road conditions ahead of a vehicle's current position are anticipated based on real-time analysis of visual information in captured image or camera data. The road surface conditions anticipated using the camera-based detection system described herein are, in some embodiments, indicative of proneness of the road surface to traction reduction (e.g., tire slippage), and are used to determine whether to perform pre-emptive activation of vehicle safety systems to prevent the occurrence of traction reduction (e.g., slippage) that may lead to adverse events (e.g., vehicular accidents). For example, vehicle driving or safety systems are proactively activated before the vehicle's tires make contact with a detected, upcoming road surface. Embodiments of such predictive activation enhance vehicle safety and performance by facilitating, for example, preemptive traction control, braking, suspension adjustment, airbag deployment, seat belt tensioning, power distribution to specific wheels, and other vehicle priming actions.

In this example, adaptive road surface detection and safety feature activation system 100 is deployed and run locally at a vehicle (also referred to in this example as the ego vehicle). In this example, adaptive road surface detection and safety feature activation system 100 includes image recognition system 102 and safety feature activation system 104. As will be described in further detail below, image recognition system 102 is configured to make an image-based prediction of anticipated conditions of a portion of road surface that is ahead of a traveling vehicle. Safety feature activation system 104 uses the image-based prediction of upcoming road surface conditions (which are indicative of an effect on traction) to determine whether to pre-emptively activate safety features (in advance of reaching the portion of road surface for which the prediction was made).

In this example, captured camera data (106) is received. In some embodiments, the camera data is captured using camera system (108). One example of a camera system is a forward-facing (in the direction of vehicle travel) camera mounted on the ego vehicle (on which system 100 is deployed in this example). For example, the camera system is pointed in front or ahead of the vehicle traveling along a road. As one example, the camera system is a monocular vision camera that is located in the center grille of the vehicle. The monocular vision camera captures camera or visual data (e.g., images or videos) of the road surface in front of the vehicle, as well as any vehicles or objects that are in the field of vision of the camera. While an example involving a monocular vision camera is described for illustrative purposes, the techniques described herein may be variously adapted to accommodate other types of camera systems and camera data, such as LiDAR ("Light Detection and Ranging" or "Laser Imaging, Detection, and Ranging") camera/data or other optical sensor/data. In some embodiments, the camera system provides real-time visual information (e.g., RGB data, depth data, etc.) about the road surface ahead of a vehicle's current position.

In some embodiments, the captured camera data includes high-resolution 2D (two-dimensional) RGB (Red, Green, Blue) images captured at a high frame rate (e.g., 60 FPS (frames per second)). In this example, suppose that the captured camera data shows a view ahead of an ego vehicle in its direction of travel.

In this example, the camera data is passed as input to the image recognition system for evaluation. In some embodiments, the image recognition system is implemented as a trained deep neural network (e.g., convolutional neural network (CNN), transformer network, etc.) that is configured to perform semantic segmentation, object identification, and classification on captured images, further details of which will be described below. In some embodiments, the various processing performed by the image recognition system is implemented via sub-modules of a model. In other embodiments, some portions of the processing may be implemented as separate models.

In this example, semantic segmentation module 110 is configured to perform semantic segmentation on the captured camera data. In some embodiments, such semantic segmentation includes filtering out pixels in the captured image data that will not be evaluated via further downstream processing (e.g., will not be classified). For example, the semantic segmentation module is configured to determine what pixels are to be classified. For example, some pixels need not be classified further, such as those pertaining to free space, vegetation that is not proximate to the road surface, mountains far in the distance, etc.

In this example, object identification module 112 is configured to identify objects within the (remaining) pixels of the captured image data. In this example, objects detected by the object identification module 112 include road surface 114, static objects 116, and dynamic agents 118.

Examples of static obstacles include guardrails, barriers, lampposts, debris, etc. Examples of dynamic agents include moving objects, such as pedestrians, cyclists, vehicles in motion, proximate vehicles, moving plastic bags that blow in the wind, etc. In some embodiments, intent prediction is performed for dynamic agents. In some embodiments, the intent prediction is performed using intent prediction module 120. Examples of intent prediction include determining the likelihood that another vehicle will swerve into the lane of the ego vehicle, whether a vehicle in front, or that is ahead, will abruptly brake, etc. The intent prediction may be performed over some time interval. Intent prediction need not be performed if no dynamic agents are identified. For example, if no dynamic agents are identified in the image, then intent prediction is not performed, saving on computational resources. In some embodiments, intent prediction is triggered in response to identifying of dynamic agents, and is not performed if no dynamic agents are detected in the image. In some embodiments, the output of the intent prediction is used to determine an assessment of the environment of the ego vehicle, which, in some embodiments, is in turn used to dynamically determine an activation threshold for activating safety features. The output of the intent prediction may also be utilized in other areas, such as for controlling autonomous driving. (e.g., directing how to autonomously operate accelerator, brakes, steering, etc.).

Image-Based Road Surface Condition Classification

In this example, the identified road surface 114 is provided to image-based road condition prediction module 122. In some embodiments, image-based road condition prediction module 122 is configured to evaluate the visual information in the captured image to assess the condition of the road surface captured in the image with respect to traction. In some embodiments, the condition of the imaged road surface is determined with respect to risk or likelihood of traction reduction (e.g., loss of traction, slippage, or the ego vehicle otherwise leaving the road in an un-commanded manner). For example, a road surface condition score is determined that is a measure that reflects or is indicative of how disposed the imaged road surface is to (or prone or susceptible to result in) traction loss such as tire slippage. In some embodiments, classifying a condition of the imaged road surface with respect to traction includes detecting or identifying characteristics of the imaged road surface (e.g., in the information pertaining to the pixels belonging to the road surface) that affect traction.

In some embodiments, the portion of the road surface that is evaluated is a sub-portion or sub-segment of what is imaged. For example, the image is segmented or divided. In some embodiments, the division is based on the speed of the ego vehicle. In this way, the upcoming portion of road that will be traversed by the vehicle within a certain window of time is evaluated to identify road conditions that affect traction (and are, for example, indicative of potential slippage). In some embodiments, the amount of distance ahead of the ego vehicle (and thus the amount of road surface) that is evaluated is expanded or increased as vehicle speed increases. For example, at any given moment, regardless of speed, the camera is able to capture a view of some distance out (e.g., 30 meters), where speed does not affect how far ahead the camera is able to see. However, at higher speed, more road surface data is accumulated for a given time interval. More data is useful, as at higher speeds, the car will have longer stopping distances. For example, for a next half second of time, a larger amount of data (and larger amount of road surface) that will be covered is evaluated to accommodate the longer stopping distances needed at higher speeds.

In some embodiments, image-based road condition prediction module 122 is configured to determine, for each pixel in the identified road surface portion of the image, a set of labels classifying the pixel according to a variety of conditions that affect or otherwise pertain to traction. For example, each pixel in the collection of pixels identified in the image as belonging to the road surface is associated with an index (e.g., coordinates in original image). That pixel (identified by its index) is associated with a corresponding vector of values, where the values in the vector for the pixel correspond to classification values that influence or affect traction.

In this example, image-based road surface condition classification module 122 includes surface type and quality classification module 124, accumulation classification module 126, slippage risk scoring module 128, and aggregation module 130.

In some embodiments, surface type and quality classification module 124 is configured to determine the material type of the road and the condition of the road absent of, or independent of, environmental factors such as weather. In some embodiments, for each pixel of the portion of pixels in the image identified as belonging to the road surface, the surface type and quality classification module is configured to perform per-pixel labeling of the material type of the road surface in the pixel, such as asphalt, gravel, ice, snow, wet pavement, etc. The identification of material type is beneficial with respect to predicting traction impact. For example, different types of road material will contribute differently to traction. Such traction contribution or impact can also vary for the same material across different environmental or surface accumulation conditions. In some embodiments, and as will be described in further detail below, environmental factors are combined with classified material types to assess risk of traction loss. For example, under dry conditions, rough asphalt has better stopping qualities as compared to concrete. However, traction for asphalt under wet conditions can be worse than concrete under wet conditions, as when it rains, asphalt surface become slick due to a layer of oil (e.g., oil slick) that will collect on the asphalt, but does not collect in the same way on concrete.

In some embodiments, surface type and quality classification module 124 is further configured to classify, for each pixel, the quality or state of the road surface, such as whether it has potholes, its age (e.g., newer or older road), etc.

In some embodiments, accumulation classification module 126 is configured to assess or classify the characteristics of any accumulated substances on the road surface identified in the image, such as ice, snow, rain, etc. As will be described in further detail below, the road surface accumulation classifications are used to predict likelihood or risk of slippage, or other ratings of road surface conditions that impact traction.

In some embodiments, each road surface pixel is evaluated for:

Color profile (e.g., reflectivity patterns, which may be indicative or suggestive of ice)

Texture (e.g., smoothness, which may be indicative of water pooling)

Temporal dynamics (e.g., motion cues, which may be indicative snow accumulation or rainwater dispersion)

Such qualities, such as the amount of translucency, can be indicative of a substance on the road surface. For example, the road surface under dry and sunny conditions may have no substances on it, and will have a corresponding appearance or visual profile. When the road surface is coated with another substance, the visual appearance will be different. These differences between the visual properties of a coated surface versus an uncoated surface can be used to determine what substance is coating the road surface, and the amount of the substance that is coating the road surface. For example, under dry, sunny conditions, the pixels for a road surface may have a certain color, such as gray. However, in poorer conditions, the road surface pixels may have a different color, such as white, with variations in the pixel colors. This may be visually indicative of light reflecting off of snow, in which case the model may determine, from the visual qualities of snow, and the classification of the underlying road surface type, that there is snow present on the road surface. The variations in the edges of the snow and the road surface may be used to determine an amount of snow. A slippage-based score (described in further detail below) can then be computed based on classification that the road surface of a particular identified type and quality is covered with a layer identified or otherwise classified as snow.

In some embodiments, accumulation classification is based on the classification of the material type of the road surface. For example, knowing whether a road surface is concrete or asphalt helps to determine, from RGB information, what substance the surface is coated with (e.g., rain, ice, snow, etc.), as well as the amount of the identified substance that has accumulated on the road surface. For example, different materials will have different colors, or will cause different amounts of different substances to have different colors or visual characteristics. For example, some materials will have a certain grayness, and snow on such a surface will have its own unique, visually identifying characteristics. Being able to differentiate between colors corresponding to road surface versus accumulated substances further facilitates improved measurement of an amount of a substance that has accumulated on the road surface.

In this example, two separate classification modules are shown for implementing surface type and quality classification, and accumulation classification, one which performs environmental-independent classification of the road surface type and quality, and another module which performs environmental-based classification of accumulation of the road surface. Such separation allows selective activation of the classification modules. For example, if the weather is determined to be ideal conditions (e.g., no presence of weather that would cause accumulation of substances on the road surface), then the environmental-based classification module (e.g., accumulation classification module 126) need not be activated. The weather-independent classification of the road surface (determined, for example, using surface type and quality classification module 124) is still maintained. In this way, if weather conditions change, and the weather-based classification module is activated, the historical, weather-independent classification of the road surface can be maintained. Such historical weather-independent classifications can then be retrieved and augmented with the weather-based labels/classifications (accumulation classifications, where the accumulations are due to circumstances external to the inherent makeup of the road, such as due to weather). For example, suppose that it is determined that snowflakes are starting to fall, or that rain has started. In this case, the road surface material and quality have already been rated, and such assessment need not be performed again. In other embodiments, the processing performed by the two modules is performed altogether, without selective activation.

As will be described in further detail below, embodiments of the image-based road surface condition classification techniques described herein include image-based traction reduction prediction, which includes predicting potential reduction in traction from information in images or video captured by the camera system of the ego vehicle that is directed to capture images of what is ahead of the vehicle (in its direction of travel). One example type of traction reduction that is predicted using embodiments of the model described herein is tire slippage. While examples involving prediction of tire slippage are described herein for illustrative purposes, embodiments of the traction reduction prediction model described herein may be variously adapted to accommodate image-based prediction of other types of reduction in contact between an ego vehicle and the surface on which the vehicle is traveling.

In some embodiments, slippage risk scoring module 128 is configured to label each road surface pixel with a per-pixel slippage (traction reduction) risk score or level. As one example, each surface-labeled pixel is assigned a score from 1 (indicating low risk of slippage) to 10 (indicating high risk of slippage). While a 1-10 scoring scheme is described herein for illustrative purposes, other scoring or traction level indicators can be used, as appropriate.

In some embodiments, a probabilistic model trained on labeled driving conditions and historical weather correlations is used to generate a slippage risk score for each road surface pixel. In some embodiments, the model is trained on tire-based traction historical data on similar surfaces. Further details regarding training of a model for image-based predicting of road surface conditions based on slippage risk are described below.

In some embodiments, the slippage risk scoring module takes as input the road type and quality classifications, as well as the surface accumulation classifications (e.g., surface reflectivity, surface substance type, amount, etc.). In this example, suppose slippage scoring on a 1-10 scale. In this example, a slippage risk score of 1 corresponds to almost no possibility of slippage, absent other factors such as intense braking. A score of 10 indicates certain slippage. Intermediate scores or values of 2-9 are in between no slippage and certain slippage, and are indicative that there is some degree of slippage that is anticipated.

As one example, based on image recognition of the image data (e.g., 15 seconds of data of the road surface), qualities of the road surface such as its material type (e.g., concrete or asphalt) and whether the road surface is coated with some substance (e.g., rain, ice, snow, sleet, etc.), a slippage score is assigned to a pixel.

For example, suppose that the image recognition system determines that the upcoming road surface is asphalt and that conditions are dry. The model predicts a lower risk of slippage than a road surface that is concrete under dry conditions. However, for an asphalt road surface under wet conditions, due to likelihood of collecting of an oil layer on asphalt in such conditions, a higher risk of slippage is assigned, as compared to concrete under wet conditions. Other types of predictions can be made based on such road traction (e.g., slippage) prediction. For example, road surface conditions also have an impact on stopping conditions, braking, etc. The road traction model described herein can be adapted for other applications (that do not necessarily involve slippage), such as determining whether a vehicle can safely make a pass, which is based in some degree on road surface conditions.

In some embodiments, the slippage risk scoring module takes as input further contextual factors or data, which, in this example, are provided via contextual data engine 132. One example of contextual data includes weather-related data, such as ambient temperature, precipitation forecasts, etc. In some embodiments, weather forecasts are obtained via an Application Programming Interface (API).

Another example of contextual data includes local vehicle data. One example of local vehicle data includes local tire condition or state data. In some embodiments, such data is used to adjust the slippage risk score determined for a road surface pixel. For example, the slippage risk score is adapted or adjusted or modified based on actual, locally stored data pertaining to the particular tires on the ego vehicle.

As one example, the compound of the tire can affect the amount of traction between the road surface and the tires. For example, while harder compound tires last longer, they have less friction and are more prone to slippage, and have longer stopping distances. While softer compound tires wear more quicky, they are grippier (and less prone to slippage) and are associated with shorter stopping distances. In some embodiments, each tire is associated with a score for how quickly the tire can stop the ego vehicle based on how hard or soft the compound of the tire is. The interaction between tire state and traction (slippage) can be predicted via training of a model that integrates such tire state data. For example, under sunny dry conditions, hard tires may have lower traction as compared to soft tires. However, under conditions in which the road surface has rain or snow on it, those harder tires may have more grooving that results in the harder tire having better traction as compared to the soft tire.

As another example, performance ratings of tires can be used in making slippage predictions. Slippage predictions can also be calibrated or based on other tire state data, such as the brand//model of the tires, tire history (e.g., last time the tires were changed), vehicle history (e.g., vehicle mileage), alignment, wear and its distribution, etc.

In some embodiments, the surface type and quality classifications, accumulation classifications, and per-pixel slippage risk scores are stored in a corresponding vector for each road-surface pixel.

In some embodiments, the slippage risk score is determined based on training using historical, actual observed slippage information. In some embodiments, the slippage risk score is an estimate given the similarity of the surface and weather to what has been observed before (and that the slippage risk scoring module/model is trained on). Further details regarding training are described below.

In some embodiments, aggregation module 130 is configured to aggregate the various scores and classifications to determine a global road condition score 134. In some embodiments, the global road condition score is an aggregate score or measure that is an assessment of the road's condition with respect to its impact on traction. As one example implementation, the aggregation module weights the outputs of the various classification modules to determine an overall global road condition score for the upcoming portion of road surface. In some embodiments, a road condition score (also referred to herein as a road surface condition score) is a measure that is indicative of the condition of the road surface with respect to traction reduction (e.g., risk of slippage). For example, lower values of the road surface condition score correspond to the road surface being in a condition (e.g., due to material type, quality, characteristics of accumulated substances on the road, etc.) that is less likely or less prone to result in tire slippage, while higher values of the road surface condition score correspond to the road surface being in a condition in which the likelihood or risk of tire slippage (or proneness of the road surface to slippage or traction reduction) is higher.

In some embodiments, the weights of the aggregation module (according to which the classification outputs are weighted) are tunable. For example, Original Equipment Manufacturers (OEMs) can tune how reactive the global condition score is to certain types of classifications. For example, one OEM may desire their global condition score to be more reactive to, or biased towards, weather related characteristics (e.g., surface accumulation classifications). Another OEM may instead desire their global road condition score to be less reactive to surface accumulation conditions, because their vehicles all have four-wheel drive (in contrast to another OEM whose vehicles are high performance, rear wheel drive vehicles).

In this example, the global or aggregate road condition traction impact score is determined according to a scale, such as a 1-10 scale for illustrative purposes. Other global road condition scoring schemes may be utilized, as appropriate. In some embodiments, the global road condition score is indicative of a likelihood or risk of slippage. In some embodiments, a higher global road condition score is indicative of a higher likelihood or risk of slippage, and a lower global road condition score is indicative of a lower likelihood or risk of slippage.

In some embodiments, the global road condition score is used as an input to determine whether to pre-emptively activate vehicle safety systems. For example, and as will be described in further detail below, safety feature activation system 104 uses the global road condition score to determine whether to pre-emptively activate vehicle safety systems 136.

For example, and as will be described in further detail below, the aggregated global road condition score is compared against a safety system activation threshold, further details of which will be described below. If the global road condition score meets or exceeds the activation threshold, then one or more vehicle safety systems are activated. Examples of vehicle systems that are pre-emptively activated include, without limitation, suspension adjustment systems (138), braking systems (140), Antilock Braking System (ABS) (142), seat belt tensioning systems (144), alerts (e.g., haptic or audio or visual feedback) (146), Advanced Driver-Assistance Systems (ADAS) (148), and airbag systems (150). Other systems include traction control systems (TCS 168), power distribution systems that control power distributed to specific wheels, autonomous driving systems, etc. In various embodiments, the vehicle safety systems are pre-emptively activated to, for example, prevent anticipated traction loss, prepare for an adverse event, etc.

For example, autonomous features (e.g., L3, L4 type autonomous features) can be activated for taking over from the driver. The degree to which autonomous features are activated can also be determined (e.g., temporary activation of partial autonomy when it is determined that there is likely to be slippage).

As another example, audio, visual (e.g., via activation of warning lights or images), and/or haptic cues (e.g., haptic vibration of the steering wheel) are activated (e.g., via alerts 146) to notify the driver of upcoming adverse road surface conditions that are indicative of slippage. In this way, drivers are given advance notice and can prepare themselves by adjusting their subjective driving behavior. For example, a haptic vibration of the steering wheel can be activated to indicate that upcoming road conditions (as perceived by the camera) are such that there is a likely change or reduction in traction (e.g., elevated level of slippage).

In some embodiments, and as will be described in further detail below, activation thresholds are used to determine whether a global road condition score meets a threshold for activating vehicle safety systems. In some embodiments, the activation threshold is dynamically adjustable, such that the reactivity of safety systems is tunable in real-time based on current conditions. Per-safety feature activation thresholds can also be determined. Further details regarding activation thresholds are described below.

While in this example, an aggregation is performed to generate a single global road condition score, in other embodiments, the various classifications are fed directly as input to determine whether to activate safety systems. In some embodiments, the use of an aggregate global road condition score facilitates reduction or minimizing of computational load at the local level, facilitating the fastest response time in order to make a real-time determination of whether to pre-emptively activate safety systems.

For example, the final decision as to whether to activate a safety system or feature may be binary. The aggregation into a global road condition score that is compared against an activation threshold facilitates reduced computational load, and fast response time when making a binary decision (where such decision is being made in real-time, locally at the ego vehicle) of whether to activate a safety system.

In some embodiments, the determination of whether to activate a safety system is a first stage of safety system activation. For example, for some vehicles (e.g., based on OEM (Original Equipment Manufacturer) settings), some safety systems may be binary in their activation, such as airbags being pre-activated or not, seat belts either being tensioned or not, ABS (Anti-Lock Braking System) being either changed or not, suspension being either changed or not. For other vehicles, safety systems can be adjusted on a number of levels. For example, some ABS systems are tunable, where braking sensitivity can be increased or decreased to various levels. As another example, the amount of seat belt tensioning may be tunable or adjustable. As another example, the speed of deployment of airbags (e.g., faster deployment, slower deployment to reduce the likelihood of injury due to the airbag) may be tunable. In some embodiments, more granular data (e.g., more granular than the single global road condition score), such as the classifications and labels described above, are used to determine specific levels of activation.

In some embodiments, subsequent to making a decision that a safety system is to be activated, how the safety system is to be configured or adjusted is determined. For example, a specific level of activation for a safety submodule is determined, subsequent to a decision having been made that the system is to be activated.

The proactive or pre-emptive activation of vehicle systems (and how such vehicle systems are activated) based on road surface conditions with respect to tire slippage predicted from images captured of the view ahead of the vehicle is performed to improve safety, such as to prevent the occurrence of adverse events, such as vehicular accidents. For example, suppose that based on analysis of an image, an upcoming ice slick is predicted. A very high likelihood of tire slippage (which may result in the ego vehicle spinning out) is predicted. Based on such a high tire slippage prediction from what has been perceived on the road, the onboard computer of the ego vehicle can pre-emptively activate safety features, such as pre-tensioning the seatbelts in advance of a potential unsafe situation or event. Using embodiments of the image-based tire slippage and road condition prediction techniques described herein, vehicle systems are proactively controlled based on what is perceived of the road surface ahead of the vehicle's direction of travel, rather than only reactively controlled (e.g., after slippage has already occurred).

The following are further examples of activating vehicle safety features based on predicted road conditions. As one example, traction control systems are pre-emptively activated based on the predicted road surface conditions to improve tire grip and stability (e.g., traction control parameters are adjusted to optimize tire grip and stability). As another example, braking systems are pre-emptively activated (e.g., pre-emptive adjustment of braking parameters) based on the predicted road surface conditions to optimize braking performance and prevent skidding. As another example, suspension adjustment systems are pre-emptively activated (e.g., pre-emptive adjustment of suspension parameters) based on the predicted road surface conditions to enhance ride comfort and stability. As another example, airbag deployment systems are pre-emptively activated based on the predicted road surface conditions to protect occupants in the event of a collision. As another example, seat belt tensioning systems are pre-emptively activated based on the predicted road surface conditions to restrain occupants securely during sudden maneuvers or impacts. As another example, power distribution systems are pre-emptively activated based on the predicted road surface conditions to optimize traction and handling. In some embodiments, feedback is provided to the driver or an autonomous driving system regarding predicted road surface conditions and activated vehicle systems.

Dynamic Activation Threshold Determination

In some embodiments, activation threshold determination engine 152 is configured to dynamically determine thresholds (e.g., threshold road condition scores) for activating various safety features or systems of the ego vehicle.

Traditional or existing system systems (e.g., ABS (Antilock Braking System), ESC (Electronic Stability Control), etc.) are triggered based on fixed speed or deceleration thresholds. As will be described in further detail below, embodiments of the safety system activation techniques described herein replace fixed thresholds with context-aware, adaptive thresholds.

In some embodiments, an activation threshold is a threshold value for determining what values of the global road condition score would trigger pre-emptive activation of vehicle safety systems. For example, the activation threshold is a threshold road condition score against which the global road condition score is compared. If the global road condition score meets or exceeds the activation threshold, then vehicle safety systems are activated.

In some embodiments, the activation threshold is dynamically adjusted based on the density of the environment proximate to the ego vehicle. As described above, in some embodiments, the activation threshold determines what threshold or minimum road condition score (which in turn is based on risk of slippage) should trigger activation of vehicle safety features.

The density of the environment will impact the consequences of slippage. For example, if a certain amount of slippage occurs, the possible consequences or likelihood of an adverse event increase, or are exacerbated, when there is a higher density of traffic or other proximate objects. In some embodiments, the threshold road condition score for triggering vehicle safety system activation is adaptive or dynamically adjusted based on the density of the environment around the vehicle.

For example, suppose two driving scenarios, one in a dense environment with many vehicles and objects around the ego vehicle, and a second scenario in a sparse environment with no vehicles or objects around the ego vehicle. Now suppose that for both scenarios, the same global road condition score of 5 (reflecting a same likelihood or risk of tire slippage due to road surface conditions) is determined for the road ahead of the ego vehicle.

In a dense environment, for the same risk of slippage (due to road surface conditions), there is a higher likelihood of an adverse event (e.g., vehicular accident) as compared to when in a sparse environment, due to there being a higher likelihood of collisions in a dense environment. In some embodiments, to increase safety and prevent or minimize the likelihood of an adverse event, the threshold for activating vehicle safety systems is adjusted based on measured proximate object density, where, for example, the activation threshold is lowered for more dense environments. In this way, lower road surface condition scores will activate vehicle systems if there are numerous vehicles surrounding the ego vehicle.

In the example dense and sparse environment scenarios, the activation threshold may be lowered to 4 in the dense scenario, while the activation threshold may be at a 7 in the empty scenario. In this example, the global road condition score of 5 would trigger activation of safety systems in the dense environment, but would not trigger safety systems activation in the empty environment.

In this way, the reactivity of triggering safety systems is dynamically adjustable based on proximate object density (and by extension, the likelihood of an adverse event). For example, suppose that the ego vehicle slips out of its lane slightly, or there is a small reduction in traction for a small amount of time, and the ego vehicle drifts a small amount. If there are no other vehicles around, and there is not a dangerous shoulder, then there is lower consequence (e.g., lower risk of an accident) for this amount of slippage. However, for the same slippage, if there is another vehicle next to the ego vehicle, then even the small amount of slippage can cause a serious accident (high adverse event likelihood with high consequence). Having a dynamically adjustable activation threshold allows different environments to be treated differently based on density.

As another example, suppose a road condition score based on a certain amount of rain on a surface, but there are no vehicles around and no concrete barriers. Further, the road is a country road with a large amount of shoulder. In this case, because there is low density of the environment, the activation threshold is set relatively high, as for the amount of slippage corresponding to the road condition score, there is unlikely to be an adverse event (e.g., collision). For example, the activation threshold is set to 4, but the road surface conditions are a 3. In this case, more snow or rain or higher slippage conditions would be needed to trigger activation of vehicle safety systems. When a driver is driving by themselves on a country road that is empty, a small amount of slippage is unlikely to result in an adverse event, and the activation threshold can be set relatively higher.

In this case of low environmental density, safety systems are not necessarily activated to prevent a certain amount of slippage. In some embodiments, the adaptive safety activation system prevents slippage that is likely to lead to an adverse event, which is also a function of environmental density. Slippage per se may not be hazardous if it is limited in time and at a minor level with no other objects around. In a sparse environment, in which there is assessed to be a lower risk of adverse events due to lower density, by not decreasing the activation threshold, the driver is provided the opportunity to address any tire slippage themselves, without being disrupted or caught unawares by unexpected intrusion or automatic activation of safety systems.

As described herein, in some embodiments, the activation threshold is dynamically adjustable based on environmental density. As changes in environmental density are detected, activation thresholds can be dynamically recomputed. Continuing with the above example, suppose that the environment was sparse, but that there are now a large number of vehicles in proximity of the ego vehicle. The threshold for safety system activation can be lowered to a 2 (lower activation threshold for higher object density), so that the road surface condition score of 3 would now trigger vehicle safety activation due to the now denser environment.

The system described herein prevents slippage that is likely to lead to an adverse event, whether that is because the slippage risk is so high that an adverse event is likely (e.g., because there are a large number of surrounding objects that a collision is likely to occur), or because a combination of anticipated slippage and environmental density is likely to result in an adverse event. That is, the dynamic vehicle safety systems activation threshold determination techniques described herein take into account that the likelihood of an adverse event is a function of both road conditions (which impact likelihood of slippage) and environmental density (which impacts the severity of consequences of slippage).

For example, an adverse event is a function of not only slippage, but how likely is the slippage to result in collision, complete loss of control of the vehicle, leaving of the road surface, collision with a fixed or moving object, or other loss of traction in which the vehicle experiences un-commanded leaving of, or separation from, the road surface. Different activation thresholds can be used under different situations based on the likelihood of an adverse event (which is a function of proximate object density).

Having density-based dynamically adjustable safety system activation thresholds further takes into consideration the costs to activating vehicle safety systems. The following are three example types of costs of pre-emptive activation of safety systems that are accounted for via the density-based activation threshold adjustment described herein.

A first example type of cost is an overcorrection cost, where when a safety system is activated, there may be inadvertent deployment. For example, if a system such as an airbag or ABS is primed or pre-activated, then it may go off or deploy more readily. A second example type of cost is in terms of energy used in pre-emptively activating systems.

A third example type of cost is a comfort cost to activating certain vehicle systems. For example, when an ABS system is activated, the resulting vehicle behavior may result in a jerkier, less comfortable experience for the driver and/or vehicle passengers. That is, while safety may be enhanced, the ride quality may be less satisfying. As another example, if the seat belts are tensioned, then this may be less comfortable for vehicle riders/occupants. As another example, when braking systems are activated, there may be increased braking sensitivity, which may be more uncomfortable and unexpected for occupants of the vehicle.

That is, if the pre-emptive triggering of vehicle system is too sensitive or reactive, this may result in an uncomfortable experience of riders. This may in turn lead to drivers actually overriding and deactivating safety features, which then reduces road safety when adverse events with greater consequences actually occur. The dynamically adjustable safety feature activation thresholds described herein also provide driver safety and certainty in preventing the activation system from being too reactive or sensitive, which may startle, or even annoy the driver, and allows the driver to make their own adjustments for slippage when environmental conditions are such that there is a low likelihood of an adverse event or adverse consequences (e.g., by not being overly intrusive in activating features that affect the dynamics of the vehicle).

As described above, in some embodiments, activation thresholds are dynamically determined based on environmental hazard assessment, such as whether there are fixed objects and agents that are proximate and hazards (e.g., based also on intent prediction). If there are agents or fixed objects in close proximity to the ego vehicle that are potential hazards, then the threshold road condition score for activating safety systems is lowered.

In some embodiments, proximate density (of potential hazards) is determined by environmental assessment engine 154, which is configured to determine the density of the environment proximate to the ego vehicle. In some embodiments, proximate density is determined based on identification, from captured camera data, of objects (e.g., dynamic agents 118 and static object 116) and their relative position/distance from/to the ego vehicle.

In some embodiments, the environmental assessment engine determines a traffic density, including the number of vehicles per kilometer per lane (or via another measurement system, as appropriate, such as the imperial measurement system or standard).

In some embodiments, determining proximate density includes determining a number of vehicles (and in some embodiments, static objects) within a radius of the ego vehicle (e.g., within a 30-meter radius). In some embodiments, the radius of consideration is determined dynamically as a function of speed of the ego vehicle. For example, the faster the speed of the ego vehicle, the larger the radius is expanded. Such speed-based radius determination takes into account, for example, the predicted stopping distance of the ego vehicle.

Activation threshold(s) are then determined based on the proximate environment density (e.g., density assessment 164). For example, the threshold for activating safety systems is lowered as the density of the environment proximate to the ego vehicle increases (e.g., lower threshold road condition score for triggering activation of vehicle safety systems), and the threshold is raised as the density decreases (e.g., higher threshold road condition score for triggering activation of vehicle safety systems).

In some embodiments, the environmental assessment further takes into account the agent intent prediction described above to determine whether the surrounding environment poses a higher danger or risk of an adverse event in the event of slippage occurring, or otherwise has an impact on whether a slippage-based accident is likely to occur (and thus vehicle systems should be more ready to be activated to avoid or prevent such adverse events). The activation threshold can then be adjusted dynamically (e.g., lowered based on determining that there is a higher likelihood of a slippage-based accident).

In some embodiments, a default or baseline activation threshold is determined based on historical data given a current or present situation. In some embodiments, different safety systems are configured with different activation thresholds. In some embodiments, the adjustability of activation thresholds is itself configurable. For example, a manufacturer can decide to simplify and lower computational load by permitting a single setting in which a system is either activated or not. For example, the manufacturer can make an OEM-level decision on whether to permit dynamic adjustment of activation thresholds. As another example, how activation thresholds are dynamically adjusted based on environmental density is tunable by OEMs. For example, there may be differentiated OEM parameters in terms of how activation thresholds are adjusted based on density.

As described above, adjustability of activation thresholds, and permitted levels of activation, can be configurable. For example, one manufacturer or OEM may have an accident avoidance ADAS (Advanced Driver-Assistance Systems) protocol, where the decision is binary as to whether or not ADAS is activated. In other embodiments, the manufacturer may permit incremental adjustment to the level of engagement of each (or a subset of) the vehicle safety systems.

Validating/Overriding of Camera-Based Road Surface Condition Scores Using Pressure and Accelerometer Data In some embodiments, camera-based road surface detection and adaptive safety activation are validated or checked against real-time physical sensor data (where physical sensor data includes force-related measures such as values of pressure and acceleration that are collected via physical sensors such as accelerometers and pressure sensor arrays).

The validating described herein provides a physical sensor-based feedback loop that correlates actual slippage with image-based predictions.

In some embodiments, camera-based road condition scores are validated using physically sensed traction data, such as pressure and accelerometer readings that provide real-time slippage assessments, as well as tire micro-pressure and accelerometer confidence levels.

For example, both accelerometer and micro-pressure sensor readings can be used to adjust global road condition scores (and in some embodiments, activation thresholds). For example, slippage, as measured by physical sensor data, is compared against what was predicted by the image-based road condition prediction model (as indicated by the camera-based road condition score). If there is a discrepancy between the camera-based road condition score and the physical sensor-based condition score, then the overall road condition score can be adjusted. For example, if the camera-based condition score did not indicate high risk of slippage, but slippage is actually being experienced according to the physical sensor data, then the road condition score from the camera-based system can be increased to reflect that there is actually a higher risk of slippage than had been anticipated by the camera-based system.

In other embodiments, rather than incrementing the global road condition score, the activation threshold is lowered or decremented. By either incrementing the road condition score or lowering the activation threshold, the reactivity of the system is increased (e.g., the safety activation system is now in a state where it is more likely to activate a vehicle safety feature).

In this example, weights of the model are not changed based on the difference between anticipated road surface conditions (via image recognition) and actual measured road surface conditions, but various values, such as the road condition score and/or activation threshold, are influenced by collected actual physical sensor data. In some embodiments, the road condition score and/or activation threshold are temporarily adjusted based on the actual physical sensor data.

In this way, the physical sensor data can be used to override the predicted value of the visual-based system, or otherwise complement the predictive capabilities of the image recognition system to improve safety.

For example, at inference time, in a typical passenger vehicle context (in which the image recognition model is not being trained), the physical sensor data has the ability to override the image recognition system's outputs on a temporary basis based on real, actual physical sensor data.

In some embodiments, the temporary adjustment is based on detection or mismatch based on the camera-based anticipated condition of a patch of road that was predicted by the image recognition system, and the actual amount of slippage that was ultimately experienced when the car passed over the patch of road for which the camera-based prediction was previously made.

For example, the camera-based surface condition slippage prediction could be a value of 7, however, the physically sensed traction data is indicating that the risk of slippage actually a 9. In this case, the road condition score used for comparison to the activation threshold can be temporarily adjusted to the physical sensor-based road condition score. For example, the override can be for a temporal threshold, such as some number of seconds or minutes. In other embodiments, the override is until visual conditions have changed, and a different camera-based road condition score is predicted.

The following are further embodiments of validating camera-based road surface condition predictions using pressure and accelerometer data. In some embodiments, accelerometer and pressure sensor data are utilized to provide a map of the road surface. Such physical sensor data validates whether the predictions made by the image recognition system turned out to be accurate (using the actual physical sensor data for the corresponding patch of road).

If actual slippage turned out to be more than the image recognition system had predicted, then road condition scoring is effectively overridden, such as to indicate higher levels of actual slippage, and which the physical sensor-based map suggests may continue (e.g., the actual slippage may be used to infer that upcoming road conditions may also have more slippage than is being predicted by the image recognition system).

In some embodiments, the physical sensor-based map of the road surface is generated in an analogous manner to image data, where instead of per-pixel RGB values, there are maps of distributions or variations of pressure across a tire contact patch.

In some embodiments, the use of physical sensor data accounts for inaccuracies or less accurate predictions or false positives from the image recognition system.

The following is another example of facilitating vehicle safety systems activation by overriding camera-based road condition scores with pressure and accelerometer sensor data.

For example, ABS may be activated earlier in scenarios where the camera-based prediction system has rated the surface as high risk of slippage with a confirmed micro-pressure anomaly pattern indicative of ice. As one example scenario, suppose that a vehicle is driving at 45 miles per hour on a shaded road. The camera system, using the techniques described herein, detects a reflective patch suggestive of ice, and assigns a global road condition score of 8 (based in part on pixel-level slippage scores).

Suppose that the micro-pressure sensor in the front-right tire records a pressure oscillation pattern that is consistent with low friction. Moments later, the accelerometer detects a slight yaw that was not commanded by steering input.

In this example, the system, using the various inputs, confirms the presence of black ice, adjusts or raises the global road condition risk score to 9, and/or lowers the activation threshold for traction control. Based on the raised road condition score and/or lowered activation threshold, safety systems are pre-emptively triggered to adjust torque to the wheels and reduce power input to maintain control, before major slippage occurs.

As described above, in some embodiments, the camera-based global road condition score is validated against collected physical sensor data. In some embodiments, the camera-based global road condition score is adjusted based on physical sensor data, resulting in an adjusted global road condition score. In some embodiments, road condition score adjustment engine 166 is configured to perform such adjustments. The adjusted global road condition score is then what is compared against the activation threshold to determine whether to activate vehicle safety systems.

In some embodiments, physical sensor data, such as accelerometer data and pressure data, is recorded over time. For example, accelerometer data and pressure data are collected via physical sensors 156 of the ego vehicle, which in this example include accelerometer 158 and pressure sensors 160. In some embodiments, the pressure sensors are located in the tires of the ego vehicle. In some embodiments, the physical sensor data is used to determine actual traction data (e.g., slippage) over time. In some embodiments, the rate of change of slippage is determined from the collected physical sensor data.

Such slippage data (e.g., rate of change of slippage) is used to determine not only how much slippage is happening, but also how much slippage is likely to occur. For example, the physical sensor-based slippage data can be evaluated to determine the rate at which slippage is increasing, which in some embodiments is used to provide a prediction or signal about slippage conditions of the upcoming road to be traveled on. Thus, the actual slippage measurements can also be used to predict or infer what upcoming slippage will be.

Micro-pressure readings from a pressure array in the tires can provide a map of the variation of the road surface. For example, suppose that there is snow on the road surface. Driving over snow may be akin to being on a bumpy, uneven road surface. The micro-pressure sensor array provides a pressure-based map indicating such variations due to the snow (e.g., peaks and troughs of the surface). This is in contrast to pressure readings on a perfectly smooth road with no accumulated substances (such as snow or ice), where the pressure sensor data is more likely to have little variation. In this way, the pressure reading profiles also provide a view of the road surface. For example, patterns or signatures of pressure distribution can be mapped to conditions indicative of various levels of slippage.

Such pressure-based maps of the road surface, in conjunction with the accelerometer data, provide an indication of the road surface and slippage. In some embodiments, the observed pattern of micro-pressure sensor readings (e.g., time series variation or distribution in pressure readings) provides an indication of a likelihood of slippage. For example, if the variation in micro-pressure readings is volatile, then this increases the likelihood of slippage.

In some embodiments, physical sensor-based road condition model 162 is configured to generate a physical-sensor based road condition score from input physical sensor data (e.g., accelerometer and/or pressure readings). The physical sensor-based road condition score may be in the same scale, format, etc. as the camera-based global road condition score. In this way, the physical sensor-based road condition model determines a physical sensor-based road condition score.

Using the techniques described herein, actual traction data derived from physical sensors such as tire-pressure and accelerometer sensors can then be used as a source for data calibration and validation. For example, as described above, the pattern of change in observed pressure over time has predictive value in providing an indication or prediction regarding the condition of the road ahead with respect to traction impact.

Comparison of the camera-based anticipated road conditions and actual slippage can be performed to determine alignment (or misalignment) between the two road condition scores derived from evaluation of different sources of collected data. For example, there may be a situation in which the camera-based prediction indicates that the surface appears clear, but this is because it was unable to clearly detect ice in the images. In this case, the image-based road condition may be scored low, and as having a low risk of slippage. However, the actual physical sensor data may disagree, with a pattern of pressure readings that is indicative of a slippery road surface. The physical sensor-based road condition score can be used to override the camera-based road condition prediction.

As another example, consider black ice. It may be the case that the visual system does not detect that there is black ice, and thus provides a road condition score indicating low risk of slippage. However, the physical sensor data may be indicative of high slippage. The physical sensor-based road condition score may again be used to override the camera-based road condition score.

As described above, in some embodiments, what is being observed in real-time about the road surface by physical sensors, and the amount of slippage experienced (determined via pressure and accelerometer data) is used to validate the camera-based road condition score.

In some embodiments, if there is a discrepancy between the physical sensor-based road condition score and the camera-based road condition score, the global road condition score that is used in determining whether to activate vehicle safety systems is the physical sensor-based road condition score.

In some embodiments, the camera parameters, or parameters for processing camera data) are adjusted based on detected discrepancy between the physical sensor-based and camera-based condition scores. In the example involving black ice (in which the image recognition system did not identify or detect, in captured images, accumulated substances such as black ice that reduce traction), processing time or pixel saturation parameters can be adjusted to improve the ability of the camera-based system to recognize black ice that is actually on the ground. For example, contrast of the camera capture system can be increased, so that the perception system can more accurately recognize ice. In some embodiments, adjustments to camera capture and perception systems are temporary. For example, a filter may be added to the perception stack to enhance the accuracy in perceiving black ice. In some embodiments, the perception system is then restored or reverted back to its previous state after ice conditions are no longer detected to be present.

The use of both camera-based and pressure/accelerometer-based data at inference time (and a determination of whether they agree with respect to traction), as described herein, improves safety. For example, the system produces predictions of anticipated slippage from camera data. Whether the anticipated slippage actually occurred can be determined from tire-sensor data (accelerometer and micro-pressure data) collected when the vehicle actually travels over the portion of road for which the camera-based prediction had been made. Based on a comparison of the camera-based slippage prediction and the actual slippage that occurred, adjustments to the system can be made.

Reliance on only physical sensor-based slippage or traction data can be limiting. For example, ice patches may be sporadic, where there are long stretches of the road surface without ice patches. If inferences were made only based on the tire-sensor data, then the tire-sensor data may report slippage when encountering an ice patch, and then make a further prediction of continued slippage based on encountering of the ice patch. However, the physical sensors are unable to determine, ahead of time, when the ice patch is actually ending. That is, the actual tire-sensor based slippage data is not necessarily indicative of continued slippage, or of what changes in road surface conditions could be. The use of camera-based slippage prediction allows the vehicle system to see ahead of the vehicle to analyze upcoming (changes in) road slippage conditions, augmenting predictions made using physical sensor data. As another example, while pressure data can provide a pressure-based reading of the road, the tire is unable to distinguish features such as rocks versus snow versus potholes versus a rough road surface. A camera can provide such a visual determination of upcoming road surface features that factor into road surface conditions that impact slippage.

Using the techniques described herein, both physically-sensed traction data and camera data are used to make slippage-related road surface condition predictions or assessments, enhancing the accuracy of slippage predictions and road surface condition prediction, and thereby increasing safety.

Training Camera-Based Road Surface Condition Prediction

The following are embodiments of training a model for image-based road surface condition detection/prediction.

Figure 2:
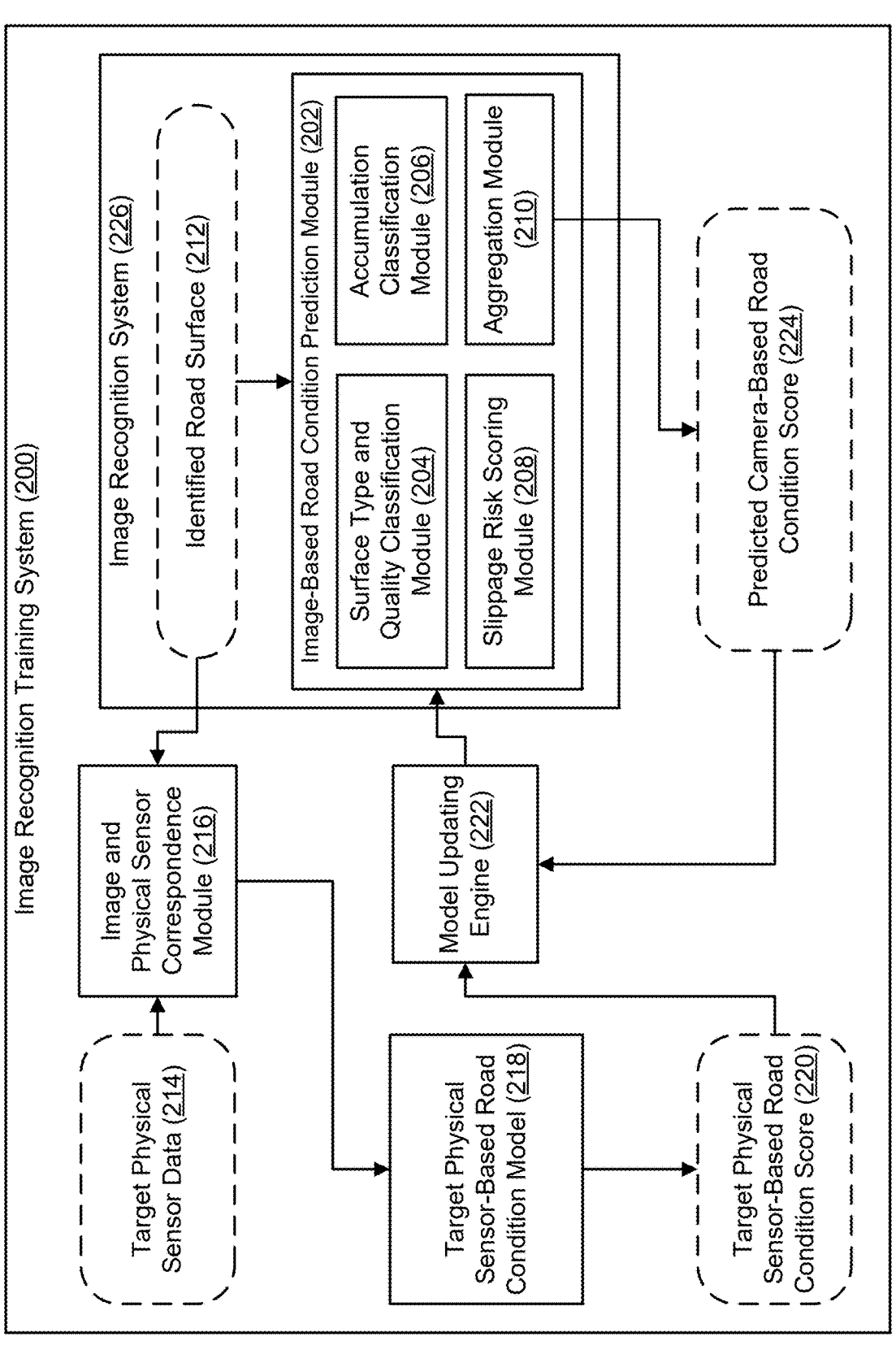
FIG. 2 illustrates an embodiment of a system for training a model for image-based road surface condition prediction.

FIG. 2 illustrates an embodiment of a system for training a model for image-based road surface condition prediction. Embodiments of the training techniques described herein are usable to train a model to predict a global road condition score from captured camera data.

Embodiments of the training techniques described herein are used to train and determine weights for neural network models such as image recognition system 226, including image-based road condition prediction module 202, instances of which are deployed and run on local vehicles. In some embodiments, image recognition system 226 is an alternative view of image recognition system 102, where the weights of image recognition system 226 are open and tunable via embodiments of the training described herein.

In some embodiments, the image-based road condition prediction module 202 is a neural network architecture. In some embodiments, the network is trained by comparing predicted camera-based road condition scores against physical sensor-based road condition scores (e.g., based on measured slippage determined from accelerometers and/or pressure sensors) that are used as targets or reference scores. For example, road condition scores are determined based on corresponding physical sensor data, and such physical sensor-based road condition scores are treated as reference or target road condition scores for training the image-based road condition prediction model.

In some embodiments, weights of the image-based road surface condition prediction module are updated over the course of training to minimize the error or difference (or loss computed) between the camera-based road condition scores outputted by the model and the target road condition scores determined from physical sensor data (e.g., physically sensed traction data). In some embodiments, the model includes multiple modules, each with their own set of tunable weights. In this example, the image-based road surface condition prediction module (202) is a model that further includes modules such as surface type and classification module (204), accumulation classification module (206), slippage risk scoring module (208), and aggregation module (210), further details and embodiments of which are described above. In some embodiments, the modules are jointly trained. In other embodiments, the modules are separately trained (or a portion of the modules are jointly trained, and a portion of the modules are separately trained).

In this example, identified road surface 212 (determined, for example, using semantic segmentation and object identification, as described above) includes a portion of upcoming road that has been identified from a captured image (or images). For example, the captured image is a high resolution RGB image captured by camera system mounted on a test vehicle as it drives over roads. The identified road surface has been recognized from the image (e.g., via semantic segmentation and object recognition). In some embodiments, the identified road surface comprises a mask with labels indicating the road surface portion (collection of pixels in an RGB image) corresponding to road surface identified from the image.

In some embodiments, the identified road surface portion is then further processed. As one example, the identified road surface portion of the image is then further divided or partitioned into sub-parts as described above, where in some embodiments the sub-division is based on the speed of the ego vehicle (which is also tracked and recorded). This allows different segments or components or portions of the perceived road surface to be classified differently. In some embodiments, the faster the vehicle is traveling, the fewer partitions are created. In some embodiments, the slower the vehicle is traveling, the more sub-components of the captured video are created. For example, if the car is moving fast, then the entire segment will be classified the same. On the other hand, if the car is moving slowly, then the captured video (e.g., one second of video) is broken up into several parts.

In some embodiments, test vehicles collect various telemetry data, such as camera video data, as well as associated physical sensor data, such as the accelerometer and micropressure data described above. The following are further embodiments of physical sensor data. In some embodiments, various types of sensors are included in the tire(s) and/or wheel(s) of a vehicle, as well as other parts of the vehicle. Examples of sensors included within a tire/wheel include tire pressure sensors. Other types of sensors included in the test vehicle include inertial sensors such as accelerometers. Tire pressure sensors may be distributed across a tire/wheel (with a portion of a sensor in the tire, and a portion of the sensor in the wheel). In some embodiments, accelerometer and tire pressure measurements are collected periodically with high accuracy (e.g., at a rate of 50 data points per second of tire pressure variation, or higher).

Such physical sensor data can be used to measure movement. For example, using such sensors (e.g., within the tire), differences in pressure over time can be measured, the relative vertical motion of a vehicle (up or down) can be measured, the amount of slippage, etc. can be detected. In some embodiments, such sensors are used to detect whether the tire loses contact with the road surface, even if for a short period of time.

As another example, a test vehicle includes an accelerometer. One example of an accelerometer is a tri-axis accelerometer. In some embodiments, the accelerometer on the vehicle measures unintended lateral or longitudinal movement that is inconsistent with intended steering or braking input. Such detection of un-commanded vehicle motion is indicative of actual slippage. As another example, if an abrupt change in accelerometer readings is observed, then this is also indicative of slippage occurring.

In some embodiments, the physical sensors communicate with an onboard computer of a vehicle (e.g., test or training vehicle that collects sensor data from tires, as well as images that contain road surfaces that the tires travel over) via communication protocols such as wireless protocols, including Bluetooth, RFID (Radio-Frequency Identification), etc. The onboard computer of the vehicle continuously records data from the physical sensors within the tire (or other movement sensors such as inertial sensors including accelerometers).

As described above, recorded physical sensor data includes accelerometer measurements and pressure measurements, etc. that are collected over time. For example, high quality, pressure sensors can be placed within the tires. Minor changes or variations in pressure, when normalized for the temperature conditions of the road, can be used to provide information about the road surface. Such accurate pressure information from tire pressure monitoring systems that continuously monitor tire pressure can, for example, be used to provide an accurate map of the road surface that the tires traveled along.

In some embodiments, such physical sensor data is combined with image-based road surface data (e.g., RGB pixels of road surface captured via a monocular vision camera) and used to generate or construct a comprehensive view of the road (or scene ahead of a vehicle's direction of travel), which are used to train embodiments of the image-based road surface condition models described herein. In some embodiments, in addition to physical sensor data and captured images, the test vehicles are also configured to capture other vehicle-related information such as how various vehicle systems were activated under certain patterns of physically sensed traction measurements. In some embodiments, such telemetry data (physical sensor data, images, vehicle system data) is collected using a fleet of training vehicles.

In this example, target physical sensor data (214) is accessed. As will be described in further detail below, such target physical sensor data will be used to generate target road condition scores that the predicted, camera-based road condition scores are compared against. Weights of the image-based road surface condition prediction module are then adjusted (e.g., through backpropagation) based on the computed loss (e.g., to minimize computed loss).

In this example, image and physical sensor correspondence module (216) is configured to determine a portion of the collected physical sensor data that corresponds with the identified road surface. In some embodiments, the collected physical sensor data includes a time series of data collected. The following are embodiments of determining a corresponding portion of physical sensor data pertaining to an identified road surface detected in the captured image.

In some embodiments, the physical sensor data is associated with timestamps. Captured camera data (e.g., videos, images that are video frames, etc.) is also associated with timestamps. In some embodiments, the portion of road surface to be evaluated is associated with depth information. For example, the distance or depth (ahead of the ego vehicle) of various road surface pixels is computed from camera parameters. In some embodiments, the speed of the vehicle at the time of the capturing of the image is also recorded. In some embodiments, the corresponding subset or portion of physical sensor data to be used in generating a target road condition score is determined based on the speed of the vehicle, as well as the distance of the portion of road surface that is being evaluated, where the time to arrive at a road surface pixel is a function of speed and time (e.g., distance=speed*time).

In some embodiments, the timestamps (or range of timestamps) of the physical sensor data to be used are determined by determining a starting distance (e.g., at ego vehicle) and an ending distance (e.g., away from, and ahead of the ego vehicle) defining the bounds of the road surface being evaluated. The speed at which the vehicle is driving over that window of distance is determined. The amount of time involved in traversing from the starting point to the ending point is determined (e.g., (end distance-starting distance)/ speed). The tire-sensor data that is used to generate a target road surface includes tire sensor data corresponding to the timestamp corresponding to the starting point and the timestamp corresponding to the end point (e.g., end point timestamp=staring point timestamp+time elapsed in traversing the amount of distance in the image being evaluated).

For example, the patch of road in the image is a certain number of meters of road. Given the speed of the test vehicle, the test vehicle traversed that patch of road of that many meters in a certain amount of time. The timestamp at the time that the image was captured is known. A second timestamp indicating when the test vehicle traversed the length of the road is determined. The timestamps are used to determine which part of the physical sensor data to use to generate a target road condition score.

Target physical sensor-based road condition model 218 is configured to generate a target physical sensor-based road condition score (220) from the portion of physical sensor data corresponding to the identified road surface. In some embodiments, physical sensor-based road condition model 218 is implemented as a neural network that is configured to map physical sensor data to a target road condition score. For example, the physical sensor-based road condition model is configured to map pressure data and/or accelerometer data to a target road condition score (that is thus based on actual observed slippage).

The following are further embodiments of mapping physical sensor data to target road condition scores. As described above, in some embodiments, physical sensor data includes micro-pressure data. The micro-pressure data forms an "image" of the variation of the surface of the road (e.g., of its topology). For example, the micro-pressure sensor provides a type of "camera" that provides a "picture" of the road surface, and an indication of its condition or properties.

In some embodiments, pressure data is provided that corresponds to the point of contact of the tire with the road. For example, the pressure sensor data that is captured pertains to the contact patch at a certain time (patch of the tire that is actually in contact with the road at a given point in time). The contact patch can be considered, for example, as a frame of tire-pressure data. As the tire rotates, a different contact patch or frame of pressure data is obtained. In some embodiments, the pressure sensor data is structured as a matrix of pressure readings, for each instance or frame of contact.

As one example, each tire of the test vehicle is fitted with a pressure sensor such as a micro-pressure sensor array that is embedded in the inner liner or valve stem of the tire. In some embodiments, the pressure sensor array captures real-time pressure gradients across the contact patch.

As one example, micro-variations in pressure (e.g., 1-5 PSI (pounds per square inch) variation across the patch) are interpreted as a sensor field that, for example, mimics pixel values. The pressure field measured for a given contact patch can be used to determine a road condition score.

For example, uniform high pressure is correlated with good grip (and lower road condition scores indicating lower slippage), while oscillating or low-pressure regions correlate or suggest low traction surfaces or conditions, such as hydroplaning or ice (and higher road condition scores indicating higher likelihood of slippage). For example, hydroplaning is detected based on a pattern of non-uniform pressure distribution being detected. The pressure sensor data resulting from the contact of the tire with the road surface provides a pressure-based description or reading of the road surface.

In some embodiments, each frame of tire pressure sensor data corresponds to tire pressure sensor data for a short period of time. Over time, the tire pressure field from the contact frames will change (as the vehicle moves and the tires continue to roll over the road surface). That is, the tire sensor data includes a time series of discrete measurements, which provide a pressure-based view or image of the road.

As described above, in some embodiments, the target physical sensor-based road condition scoring model is implemented as a neural network with its own set of weights. In some embodiments, the matrices of physical sensor data are provide as input to the model. The model (which has been trained) outputs a road condition score based on the physical sensor data.

In this example, while the image-based road surface condition module generates road surface condition predictions from per-pixel RGB data, the physical sensor-based model/system is trained to generate road surface condition scores from frames (representing, for example, tire contact patches) of pressure variation.

The road condition score determined from the physical sensor data is then used as a target road condition score to train the image-based road surface condition model to improve its accuracy in generating camera-based predictions of road surface conditions.

In some embodiments, model updating engine 222 is configured to compute a loss between the predicted camera-based road condition score (224) output by the image-based road surface condition prediction module and the target road condition score (220). For example, the loss is computed according to a loss function. Based on the difference or loss between the camera predicted road condition and the target road condition score, the model updating engine is configured to update or adjust the weights of the image-based road surface prediction model (and the weights of its various modules, jointly in some embodiments) such that the camera-based predictions align or correlate with the actual, physical sensor-based road condition scores used as targets for training the image-based road surface condition prediction model. For example, the model updating engine is configured to use backpropagation to adjust weights based on loss (or gradients) computed using a loss function.

In some embodiments, if actual slippage is detected from the pressure/accelerometer data, backpropagation is performed through the layers of the neural network to adjust weights to improve the predictive accuracy of pixel classifications using new data. In some embodiments, online learning is used to improve prediction accuracy.

In some embodiments, using the techniques described herein, patterns of pressure variation and distribution, as well as inertial/accelerometer readings, are used as a source of actual slippage and road surface condition data to generate a target road surface condition scores for training image-based road surface condition prediction with respect to traction impact.

Collection of Training Data

The following are embodiments of collecting training data for training an image-based road surface condition prediction model.

As described above, as one example, road condition scores are generated on a 1-10 scale, where there are different levels of road condition according to which a road surface can be classified (the techniques described herein may be variously adapted to accommodate other scoring scales or schemes).

In some embodiments, target physical sensor data and target physical sensor-based target road condition scores are generated or otherwise determined for each road condition score level for training purposes. As will be described in further detail below, in various embodiments, physical sensor data and road condition scores are determined based on physical sensor data collected from test vehicles and/or are synthetically generated.

In some embodiments, training data is collected or gathered using test vehicles. In some embodiments, physical sensor data and camera data are captured and labeled with corresponding values or levels of the road condition scoring scale.

For example, physical sensor data captured under ideal conditions, such as an ideal non-worn perfect tire in perfect weather conditions on a perfectly smooth surface, is labeled with a road condition score of 1 (e.g., lowest risk of slippage, ideal road conditions). For example, physical sensor data and corresponding camera data captured when driving under ideal conditions, such as over a perfect, brand-new road, under perfect weather (e.g., ideal temperature), using brand new tires is labeled with a road condition score of 1.

In some embodiments, determining the conditions correlated with a particular level of slippage is based on starting from conditions in which there is no slippage (e.g., ideal conditions). Such no-slippage conditions are determined using data collected from test vehicles that drive about under ideal conditions. For example, starting from known conditions for no slippage, the image-based road surface condition prediction model determines how various features in images relate to slippage based on their deviation from non-slippage conditions.

In some embodiments, target physical sensor data corresponding to every level of road condition score is utilized to train the image-based prediction model (e.g., for scores 1, 2, 3, 4, 5, 6, 7, 8, 9, and 10 on a 10-point scoring scale, as in the examples described herein for illustrative purposes). For example, conditions for no slippage and for total slippage are determined. However, there may be a large amount of variability in intermediate levels of road condition (e.g., levels 2-9, between extremes of no slippage (level 1), and total slippage (level 10)). The following are further embodiments of determining physical sensor data and conditions for intermediate road condition scores.

Synthetic Physical Sensor Data

Using a test vehicle to capture physical sensor data and images in adverse conditions (e.g., bad weather conditions in which there will be higher tire slippage) can be dangerous and unsafe for drivers of test vehicles. In some embodiments, synthetic imagery and synthetic physical sensor data are used to determine target road surface condition scores.

The following are embodiments of generating synthetic data for generating target road condition scores. As one example, existing video data is collected or obtained or received for a certain road condition for which known physical sensor data is available. In some embodiments, data pertaining to adverse weather conditions is purchased from a third party.

A model, such as a generative AI (Artificial Intelligence) model (e.g., diffusion model) is used to generate a synthetic video in which the generative AI model modifies the existing video with a certain weather condition, such as snow (e.g., to simulate video data corresponding to a certain road condition score). Synthetic accelerometer and/or pressure sensor data is predicted for the synthetic video and the corresponding road condition score, such as based on known physical sensor data.

In some embodiments, to validate the synthetic information, a test vehicle is sent out in the corresponding weather conditions (e.g., snow) to determine the quality or accuracy of the synthetic physical sensor data and synthetic slippage.

In this example, snow was added to an existing video using generative AI to generate a synthetic video under a specified condition.

In some embodiments, an AI model is used to predict the slippage for the synthetic video/image. A target road condition score is generated for the synthetic image using the model. In some embodiments, validating of the model is performed. If there are discrepancies between the slippage measured by the test vehicle and the predicted slippage for the synthetic image, then the physical sensor-based road condition prediction model is updated (and test vehicles sent out again for validation). Such a workflow minimizes or otherwise reduces the amount of time drivers and test vehicles spend out in snow or adverse weather conditions, reducing danger.

In some embodiments, synthetic images and corresponding physical sensor data are generated for road condition scores that are above a threshold value. For example, for less ideal, but relatively mild conditions (e.g., a regular amount of rain) that corresponds to road condition scores up to a level of 3 out of 10 in the numerical road condition score scale, test vehicles may be sent out to collect such data. However, for higher road condition scores, more synthetic data is used to avoid having to send out test vehicles and drivers in more dangerous driving conditions.

The following are further embodiments of generating synthetic slippage-based road condition scores. In the example described above, for road condition scenarios below a certain level of risk, test vehicles are sent out to capture training data, such as captured video data and corresponding tire pressure and accelerometer sensor data. For example, such actual data is captured for conditions that would be classified as being between 1-3. In some embodiments, for such levels of 1-3, actual tire slippage values can be computed from the actually captured physical sensor data (pressure and accelerometer readings) and used to generate corresponding road condition scores.

In some embodiments, for higher values of road condition scores, which may correspond to road conditions for which it may be unsafe to send out test vehicles and test drivers, tire slippage values and physical sensor data are simulated or synthesized. For example, extrapolation is performed from the level 1-3 data to extract tire slippage values for worse road surface conditions. For example, with respect to levels 1-3, at least some weather condition variability (e.g., some amount of snow or rain) is captured, along with corresponding tire sensor data. Higher road condition score values (corresponding to worse road conditions) involve more extreme amounts of such surface accumulation (e.g., more snow and ice or rain). The tire slippage under such situations can be extrapolated from the physical sensor data captured at lower (but non-zero) amounts of such weather accumulations and road conditions.

In some embodiments, instances of trained models are then deployed to vehicles. In some embodiments, the various models used to generate camera-based road surface conditions, synthetic images, etc. are updated or recalibrated using in-vehicle physical sensor data collected from various vehicles driving about (not necessarily only from test vehicles). In some embodiments, updates to the various models are then pushed back to vehicles. In this way, feedback from vehicles is used to update the accuracy of perception-based road surface condition prediction, with the updated models pushed back to vehicles to improve vehicle safety when driving.

In some embodiments, as test vehicles travel over various road surfaces under various conditions, the weights of the image recognition neural network models are open and are calibrated with physical sensor data to improve the accuracy of the predictions (e.g., degree to which perceived conditions are predictive of slippage). In some embodiments, the physical sensor data collected by training or test vehicles is utilized to continuously correct and calibrate the various classifications and labels generated for each pixel, as well as the aggregation to determine a road condition score, which is also based on the pixel-level slippage scores.

FIG. 3 is a flow diagram illustrating an embodiment of a process for adaptive road surface detection and safety feature activation. In some embodiments, process 300 is executed by adaptive road surface detection and safety feature activation system 100. The process begins at 302 when an image including a portion of road ahead of a vehicle is received. For example, a camera system mounted to, or otherwise installed on an ego vehicle captures an image of, or otherwise perceives, a view ahead of the vehicle's direction of travel. Examples of camera systems that can be used to capture the image include monocular vision cameras, multi-camera systems (e.g., six camera systems), LiDAR imaging systems, etc. As one example, suppose that the captured image is captured using a monocular vision camera. For example, the monocular vision camera is positioned in the middle of the grille of the ego vehicle. As one example, the captured camera data includes captured RGB (red, green, and blue) image or video feed data. The camera perceives and captures images of the road surface. In some embodiments, the camera captures a certain amount of road surface ahead of the ego vehicle at a certain rate. For example, the camera captures, records, or detects 30 feet of road surface, once a second. As one example, a second's worth of footage may be captured of the view ahead of the ego vehicle as it travels along a road, which is then evaluated for road surface conditions. The view may include not only the portion of the road surface ahead of the vehicle, but also objects proximate to or otherwise in the environment of the ego vehicle, such as other vehicles, pedestrians, barriers, vegetation, etc.

The image is then provided to an image-based road surface condition prediction model that is trained using physically-sensed traction data.

At 304, the portion of road in the image is identified. In some embodiments, the captured image is ingested by a perception stack. In some embodiments, identifying the portion of upcoming road includes performing semantic segmentation on the captured image, separating signal from noise. For example, pixels for further evaluation are retained, while pixels that are not to be processed further (e.g., are determined to be noise) are discarded. In some embodiments, object identification is then performed. For example, various objects in the captured camera data are identified. Example types of identified objects include dynamic objects (also referred to herein as agents), and static objects, examples of which are described above.

Another type of object that is identified in the image is the group of pixels in the image corresponding to the road (or other type of path) that the ego vehicle is traveling on. In some embodiments, within the identified road portion, sub-objects or sub-components of the road are further identified, such as lane lines, road surface, curves, etc.

At 306, a condition of the portion road is determined using an image-based road condition prediction model that is trained based at least in part on physically-sensed traction data. In embodiments of the techniques described herein, road surface classification is performed on the portion of the captured visual image that is identified as the road surface.

For example, classification of road surface pixels (pixels in the image that have been identified as belonging to a portion road) is performed.

In some embodiments, the conditions of a road surface are determined based on identifying or detecting characteristics of the imaged road surface that affect traction, including factors such as the construction or type of the road (e.g., its material composition or makeup), the quality or state of the road (e.g., maintenance level), and the presence, type, and amount of any road contaminants or substances that are on the road surface, further details of which are described above. Such factors affect the amount of traction or grip that is available between the road surface and the tires (and hence can impact whether tire slippage will occur, and to what degree).

The following are further embodiments of classification of image data for visually determining road conditions. In some embodiments, determining a road surface condition includes performing classification of road surface pixels using an image-based road surface condition model (e.g., module 122). In some embodiments, the road surface classification includes labeling the pixels belonging to the identified road surface in an image. In some embodiments, the model is trained using physical sensor data (e.g., physically sensed traction data obtained from physical sensors such as tire pressure sensors and accelerometers). In some embodiments, the image-based road condition model is implemented as a neural network.

In some embodiments, each pixel of the identified road surface portion is labeled with one or more road surface classifications. In various embodiments, road surface condition classifications include road material composition and quality classification, as well as road overlayer or surface accumulation classification. For example, the composition of the road material is determined from the image (e.g., whether the road is asphalt, concrete, etc.). Different types of road material have different impacts on traction, where, for example, concrete may be less prone to slippage than asphalt under certain conditions (e.g., weather-related conditions, which may also be identified from the image using the techniques described herein).

In some embodiments, the quality of the road is also determined (e.g., whether the road surface has potholes). In some embodiments, the classification of the quality of the road surface includes classifying the state of the road surface as low quality, high quality, or any other measure of road surface quality as appropriate. For example, a road surface in which a large number of potholes is identified may be classified as a low or poor-quality road surface. Road surfaces in a poor state may be predicted to result in a greater loss of traction. For example, potholes may cause tires to experience sudden losses of grip with the road surface (due to loss of contact).

In some embodiments, road overlayer or accumulation classification is performed, which in some embodiments includes classifying additional layers on top of the road surface, such as any road contaminants or substances that have accumulated on the road surface, such as due to weather. Examples of such substances or accumulations that are identified in images include oil, rainwater, snow, ice, grease, a mixture of such deposits, etc. Layers of such substances that have accumulated on a road's surface can also impact the traction between the road surface and the tire, and thus influence or impact the amount of slippage that may occur (e.g. impact how prone the surface is to slippage). In some embodiments, an amount of accumulation is also determined. In some embodiments, and as described in further detail above, accumulation classification is performed by evaluating each road surface pixel for color profile, texture, temporal dynamics, etc.

In some embodiments, determining a road surface condition includes making a prediction of the likelihood of upcoming tire slippage (e.g., slippage risk scoring described above). For example, the model (or a module of the model) outputs an indication or likelihood of upcoming tire slippage. In some embodiments, the slippage risk score is based on the classification of road surface material/quality, as well as classification of layers of accumulated substances on the road surface. In some embodiments, the tire slippage risk scores are generated for each road surface pixel.

In some embodiments, the tire slippage prediction is a value indicating a likelihood or rating of slippage. For example, the output is in the form of different levels or bands, indicating different levels of probability of tire slippage. For example, a score on a ten-point scale may be assigned to each pixel, as described above. As another example, the model may provide output according to a three-level tier, indicating low, medium, or high likelihoods of tire slippage. For example, if certain road surface properties have been identified by the perception stack that are more likely to result in tire slippage, then a mid or high level of likelihood of tire slippage is output by the model. If, on the other hand, the road surface conditions are good, then there is a lower likelihood of tire slippage, and the model provides an output indicating the low likelihood of tire slippage from the captured image. In some embodiments, slippage risk is also determined based on contextual factors, as described above. One example of a contextual factor is weather-related information (e.g., obtained via an API). Another example contextual factor is driver data, such as driver history, driving style (e.g., whether the driver is a type of person that has a tendency to accelerate in difficult conditions, which may impact the likelihood of slippage), etc. Another example contextual factor is tire condition or state. For example, the tire slippage prediction can be further based on integration of tire condition data. Objective tire condition data is relevant to adhesion, friction, and road stopping times. In some embodiments, tire condition data includes visual images captured of the tire(s) of the vehicle, such as visual data captured using cameras that have a portion of the tire in their field of view. Other tire data that may be utilized includes, model, compound type, profile, wear, alignment, etc. Other contextual data that may be used to assess tire slippage risk includes maintenance history of the vehicle.

In some embodiments, tire slippage risk scores, as well as outputs of other modules (e.g., per-pixel road material type and quality classifications and per-pixel road surface accumulation classifications) are aggregated together to determine a global road condition score that is indicative of the condition of the upcoming road surface (as identified in an image) with respect to traction impact. For example, the aggregate road condition score is indicative of the proneness of the road to slippage or traction loss, with different values and scores for different road conditions based on their impact on traction.

In some embodiments, the global road condition score is a numerical measure or score, such as on a 1-10 scale as illustrated in the examples above. For example, a road condition score of "1" can be utilized to indicate that road surface conditions are such that the risk of slippage is lowest, such as under conditions in which the road is perfectly smooth, perfectly level, perfectly dry, in very good condition, no oil, etc. On the other hand, a score of "10" can indicate that road surface conditions are such that the risk of slippage is highest. Road condition scores in other schema may also be utilized to rate road conditions with respect to traction impact, as appropriate. In some embodiments, the aggregate road condition score is a global slippage risk score indicative of a proneness of the road surface to slippage. As described above, the aggregate road condition score takes various factors into account that affect the road surface's proneness to road slippage, such as road surface material composition and quality, identified substances or contaminants that have accumulated on the road surface (and their volume), etc.

In some embodiments, the camera-based road condition prediction is validated using actual observed traction data. In some embodiments, the camera-based road condition score is validated using a physical sensor-based road condition score. For example, physical sensors such as pressure sensor arrays and inertial sensors such as accelerometers in/on the vehicle are used to measure actual tire slippage and road surface conditions. The patterns of actual experienced tire slippage and road surface conditions can be used to infer a physical sensor-based road sensor score. For example, the rate of change of tire pressure distribution can be used to assess or infer road surface conditions as well. In some embodiments, the camera-based road condition score is compared against the physical sensor-based road condition score. If there is a mismatch or misalignment between the two scores (e.g., difference that is greater than a threshold), then in some embodiments the camera-based road condition score is overridden with the physical sensor-based road condition score. The overriding can be temporary, for example, until alignment is determined between the camera-based and physical sensor-based road condition scores (e.g., as they change as the vehicle travels and more images are captured).

In some embodiments, the physical sensor-based road condition score provides a confidence of the camera-based road condition score. As one example, at inference time, a confidence interval is validated by whether physical sensor data supports the prediction made based on the visual camera data. For example, at inference time, the physical sensor data is not necessarily used to update weights of the image-based road surface condition scoring model, but is used to validate image-based predictions. In this way, the real-time physical sensor data can also provide an override mechanism. In some embodiments, a confidence interval, validated by the tire sensor data, is variable, preventing the vehicle activation systems from overreacting, such as constantly tightening seatbelts or activating airbags or changing suspension. For example, the reactivity of activation of vehicle systems based on image-based road surface condition predictions can be modulated by physical sensor data.

At 308, a determination is made as to whether to pre-emptively activate one or more safety-related features of the vehicle based at least in part on the condition of the portion of road predicted by the image-based road condition prediction model. For example, based on the camera-based road condition score (which is based in part, for example, on real-time predicted likelihood of upcoming traction reduction), various actions can be taken, such as pre-emptive activation of vehicle systems. Such actions include commanding or directing onboard computing systems of the vehicle to make changes to suspension, braking, ABS (Anti-lock Braking System), traction control, seat-belt tensioning, pre-activating airbags, or other safety measures, etc.

In some embodiments, a road condition score (e.g., camera-based road condition score or adjusted score if overriding using physical sensor-based road condition scoring during validation, as described above) is compared against an activation threshold to determine whether the road condition score meets or exceeds the threshold for activating safety systems.

In some embodiments, the activation threshold is adaptive. For example, the activation threshold is dynamically adjustable based on an assessment of the environment surrounding the ego vehicle. In some embodiments, assessing the environment surrounding the ego vehicle includes assessing a density of objects proximate to the ego vehicle. For example, objects proximate to, or in the vicinity of, the ego vehicle are identified and classified in the images captured ahead of the ego vehicle. Such objects include both agents, as well as non-agents. As referred to herein, agents include moving objects such as vehicles or pedestrians. Non-agents include non-moving objects, such as stationary objects including concrete barriers, trees, etc. In some embodiments, for agents, intent prediction is performed to anticipate or predict the motion or behavior of such moving entities.

In some embodiments, a density of proximate vehicle traffic is determined. For example, as described above, a number of vehicles per lane, as well as the number of objects within a radius of the ego vehicle are used to determine the proximate object density (relative to the ego vehicle). In some embodiments, the radius of consideration around the ego vehicle is dependent on speed (e.g., radius increases for higher speed).

In some embodiments, the proximate density is indicative of the likely severity of an adverse event that would occur in the event of slippage. In some embodiments, the denser the environment surrounding the ego vehicle, the lower the activation threshold. For example, the denser the environment, the higher risk there is of an adverse event (e.g., vehicular accident) if tire slippage occurs. In some embodiments, lowering the activation threshold lowers the threshold road condition score that triggers activation of vehicle safety features (which would be activated to prevent or reduce slippage and its consequences). The activation threshold can be adjusted as environmental density changes. For example, as the proximate environment becomes less dense, then the threshold road surface condition score for activating safety systems can be raised.

For example, even if road surface conditions are such that a loss of traction is anticipated, if the environment is free of objects, then the consequences of slippage, such as the likelihood of an adverse event, may be lower. For example, suppose that it is determined that there is some amount of ice on the road surface, making slippage more likely. However, the image recognition system determines from the image that the vehicle is on a country road with broad shoulders and runoff, with no proximate vehicles or other objects such as barriers. In this case, the likelihood of an adverse event such as an accident may be low. In this example case, the activation threshold can be raised to be higher (or not made lower), as the likelihood of an adverse event is lower, even if a certain amount of slippage were to occur.

On the other hand, if the road surface has a high likelihood of reduced traction (and a high likelihood of slippage), and it is determined that there is also a high density of traffic with many drivers, as well as concrete barriers, then the consequences of tire slippage are high, and there is a higher likelihood of a severe adverse event. In this example case, the activation threshold is lowered, such that lower amounts of anticipated slippage would trigger pre-emptive activation of vehicle safety systems.

The techniques described herein proactively engage or activate vehicle systems in response to image-based road surface condition predictions made based on analysis of recorded camera data ahead of the vehicle. In some embodiments, vehicle systems are proactively engaged to avoid, prevent, or mitigate the consequences of an anticipated adverse event, thereby increasing safety.

Further details regarding adaptive road surface detection and safety feature activation are described above.

FIG. 4 is a flow diagram illustrating an embodiment of a process for training an image-based road surface condition prediction model using physically-sensed traction data. In some embodiments, process 400 is executed by image recognition training system 200 of FIG. 2. The process begins at 402, when an image including a portion of road ahead of a vehicle is received. In some embodiments, the portion of road is identified in the image, such as via semantic segmentation and object identification. In some embodiments, the portion of road identified in the image (e.g., road surface pixels) is provided as input to an image-based road condition prediction model, embodiments of which are described above.

At 404, an image-based road surface condition prediction that is predicted using the image-based road condition prediction model is compared against a target road condition. In some embodiments, the image-based road surface condition prediction is an image-based road surface condition score. In some embodiments, the target road surface condition is a road surface condition score that is generated from physical sensor data. In some embodiments, the physical sensor data includes accelerometer and/or pressure sensor data. In some embodiments, the physical sensor data used to generate the target road surface condition score is target physical sensor data that has been determined to correspond to the portion of the road surface identified in the image, as described in further detail above.

In some embodiments, the images and physical sensor data used for training the image-based road surface condition prediction model are collected using test vehicles. For example, the tires of the training/test vehicles include tire sensors (e.g., micro-pressure sensor arrays) that collect data associated with the tires as the training vehicle travels, as well as inertial sensors (e.g., accelerometers) that sense motion of the vehicle. As described above, training or test vehicles also capture images or video of the road ahead as the training vehicles move.

In some embodiments, the tire pressure sensors and accelerometers collect physical sensor data pertaining to the actual conditions of the road on which the training vehicle is traveling, as well as indications of vehicle behavior and traction (e.g., tire slippage). In some embodiments, the physical sensor data is used to create target road surface condition predictions that image-based road surface condition predictions are compared with. In some embodiments, the occurrence of actual tire slippage (for which image-based predictions are being made) is determined from the physical sensor data. For example, micro-slippage variations, bumps, etc. can be determined from time series of pressure and accelerometer tire sensor readings.

At 406, the image-based road condition prediction model is trained by updating or tuning weights of the image-based road surface condition prediction model based on the comparison of the image-based road surface condition score and the target road condition score generated using physical sensor data.

In some embodiments, tuned or trained instances of the image-based road surface condition model are then deployed or otherwise provided to vehicles and used to perform real-time image-based tire slippage and road surface condition prediction at inference time. In some embodiments, retraining of the image-based road surface condition model is performed as new training data is received, to update the accuracy of the model. Updated versions of the image-based road surface condition model (and the image recognition system) can then be deployed to vehicles via patches or OTA (over-the-air) updates.

Further details regarding training of image-based road surface prediction models are described above.

Peloton-Based Activation Threshold Adjustment

As described above, in some embodiments, the activation threshold for determining whether to activate vehicle safety systems is dynamically adjustable, such as based on proximate density. The following are embodiments of techniques for peloton-based activation threshold adjustment, in which one vehicle's activation threshold is adjusted based on what is experienced by another vehicle that is close by (and ahead).

As one example, suppose a road on which a number of vehicles are traveling. In this example, suppose that multiple of the vehicles are equipped with their own deployed instances of the adaptive road surface detection and safety feature activation system described herein, as well as the capability to collect physical sensor data (e.g., accelerometer and pressure data).

Suppose a first vehicle. In this example, using embodiments of the peloton-based techniques described herein, other vehicles in proximity of the first vehicle (also referred to herein as being within a peloton) act as sensors that are capable of providing various signals to the first vehicle based on their own sensing. In some embodiments, and as will be described in further detail below, in response to the first vehicle receiving one or more signals broadcast by transmitting vehicles in a peloton of vehicles surrounding the first vehicle (e.g., transmitted by a second vehicle that is ahead of the first vehicle on the road) the first vehicle adjusts its activation threshold based on what the surrounding vehicles in the peloton are experiencing.

For example, suppose a vehicle in the group experiences actual slippage that had not been predicted or anticipated by that vehicle's local instance of the image-based road surface condition prediction model. Based on detection of this discrepancy (or detecting of the image-based model having not anticipated slippage, or not generated a road condition score commensurate with higher risk of slippage), the vehicle transmits a signal to other vehicles in the peloton to adjust their respective safety systems activation threshold before they hit the patch of road surface that the vehicle has just traveled over (and for which actual slippage was detected based on physical sensor data, but such slippage had not been anticipated for that patch of road surface by the forward-looking image-based road condition prediction model).

In this example, the peloton behaves as a type of predictor that can be used to activate safety systems. Vehicles in the peloton act as sensors to notify other vehicles and assist them in activating their local safety systems, in response to a vehicle detecting that its own safety systems were not activated in time due to there being more actual slippage than what had been predicted by the camera-based system.

In some embodiments, the above-described peloton-based activation threshold adjustment operates for every vehicle within the peloton that is configured or capable of communicating. In some embodiments, the vehicles in the peloton, in response to receiving an activation threshold adjustment signal, temporarily adjust their local activation thresholds (which in turn causes those vehicles to be more reactive to road conditions) based on actual conditions (as experienced by the vehicle that transmitted the signal).

For example, in response to detecting that actual slippage is more than had been indicated from the image-based prediction, an adjustment signal to lower activation thresholds can be transmitted. This is done to improve safety, as decrementing activation thresholds, or lowering the threshold road condition value that would cause activation of safety systems, increases the sensitivity and reactivity of activation of safety systems in response to slippage that is predicted from images.

In other embodiments, the activation threshold adjustment signal can also be a signal to increase the activation threshold. For example, it may be the cause that the actual slippage is not as severe as what is predicted by the image-based prediction system, which is causing vehicle systems to be activated unnecessarily in a manner that is intrusive or of annoyance to vehicle occupants. In some embodiments, in such a scenario, an adjustment signal to increase activation thresholds can be transmitted.

In some embodiments, the adjustment is temporary, and the activation threshold for a vehicle resets back to another value (e.g., previous value, default value, etc.). In some embodiments, the activation threshold is reset after a threshold period of time.

In some embodiments, an indication of transmission of an activation threshold adjustment signal is provided back to a central host (e.g., operated by an entity that manages the training and distribution of the perception-based road condition prediction model), which records that the activation threshold adjustment signal was sent, such as for diagnostic purposes (as the adjustment signal was transmitted due to a vehicle experiencing slippage that had not been anticipated by the image-based road condition prediction model).

In this way, safety is increased for other vehicles, even if a first vehicle's image-based road condition prediction model did not accurately predict slippage, as the first vehicle can, using the peloton-based techniques described herein, act as a highly accurate sensor for other vehicles that are behind (but will encounter or travel over the same portion of road surface).

In some embodiments, vehicles not in a peloton do not adjust their activation threshold, even if they detect the activation threshold adjustment signal (e.g., because they are in reception range of the signal of broadcasted by the transmitting vehicle, but are not physically close to the transmitting vehicle).

The following are embodiments of determining a peloton range for permitting adjustment of activation thresholds in response to receiving of an activation threshold adjustment signal.

In some embodiments, the peloton-based techniques described herein operate or are activated within a relatively dense environment (e.g., locally activated by a vehicle).

For example, as described above, dense environments are ones in which the consequences of slippage are more dangerous, and there is a higher likelihood of an adverse event. To improve safety, the techniques described herein increase the sensitivity and reactivity of activation of safety systems in response to slippage (e.g., by decrementing activation thresholds, or lowering the threshold road condition value that would cause activation of safety systems).

In some embodiments, when in a dense environment, a vehicle activates peloton-based functionality, such as transmitting of, and monitoring for, activation threshold adjustment signals. For example, when activated, a vehicle seeks or listens or scans for activation threshold adjustment signals from surrounding vehicles (which are transmitted by a surrounding vehicle due to slippage being encountered that was not predicted by that vehicle's image-based road condition prediction model). If some vehicle determines that unanticipated slippage had occurred, and peloton-based functionality has been enabled for that vehicle (because the vehicle is determined be in a dense environment) then that vehicle sends out an activation threshold adjustment signal. If the listening vehicle is determined to be within the peloton of the transmitting vehicle, then the listening or receiving vehicle decrements or lowers their activation thresholds in response to the transmitting vehicle's signal that there will be more slippage than what the listening vehicle's instance of the image-based road condition prediction model will anticipate. In this way, the vehicles receiving the signal will be more prepared for poorer upcoming road conditions than they otherwise would have been without the signal.

The following are further embodiments regarding peloton-based safety system activation threshold adjustment.

As will be described in further detail below, peloton-based adaptive safety feature activation thresholds are provided. In some embodiments, peloton-based adaptive safety feature activation thresholds are provided in dense environments.

In some embodiments, the determination of denseness is based on detection, using perception-based systems, of the number of objects (e.g., vehicles) per lane of a road. In some embodiments, whether the vehicle is in a dense environment is further based on a determination of a count of the number of vehicles that are within a radius of the ego vehicle, where the peloton radius is dynamically adjustable based on the speed of the ego vehicle. Further examples and details regarding determining of proximate density are described above.

In some embodiments, peloton-based safety system activation threshold adjustment is a feature that can be locally activated or deactivated at a local vehicle. For example, a local vehicle determines whether to turn on or enable such peloton-based functionality (e.g., functionality related to transmitting and receiving of peloton-based activation threshold adjustment signals). In some embodiments, the determination of whether to enable such peloton-based functionality (e.g., transmitting of and/or listening to peloton-based adaptive activation threshold adjustment signals) is based on whether the vehicle is in a dense environment. For example, the peloton-based functionality is turned on when it is determined that the vehicle is in a dense environment.

In some embodiments, the peloton-based functionality includes functionality and logic for determining both whether to transmit or broadcast activation threshold adjustment signals, as well as logic for determining whether to accept detected activation threshold adjustment signals (where accepting includes adjusting their local activation thresholds in accordance with the received adjustment signal).

Figure 5:
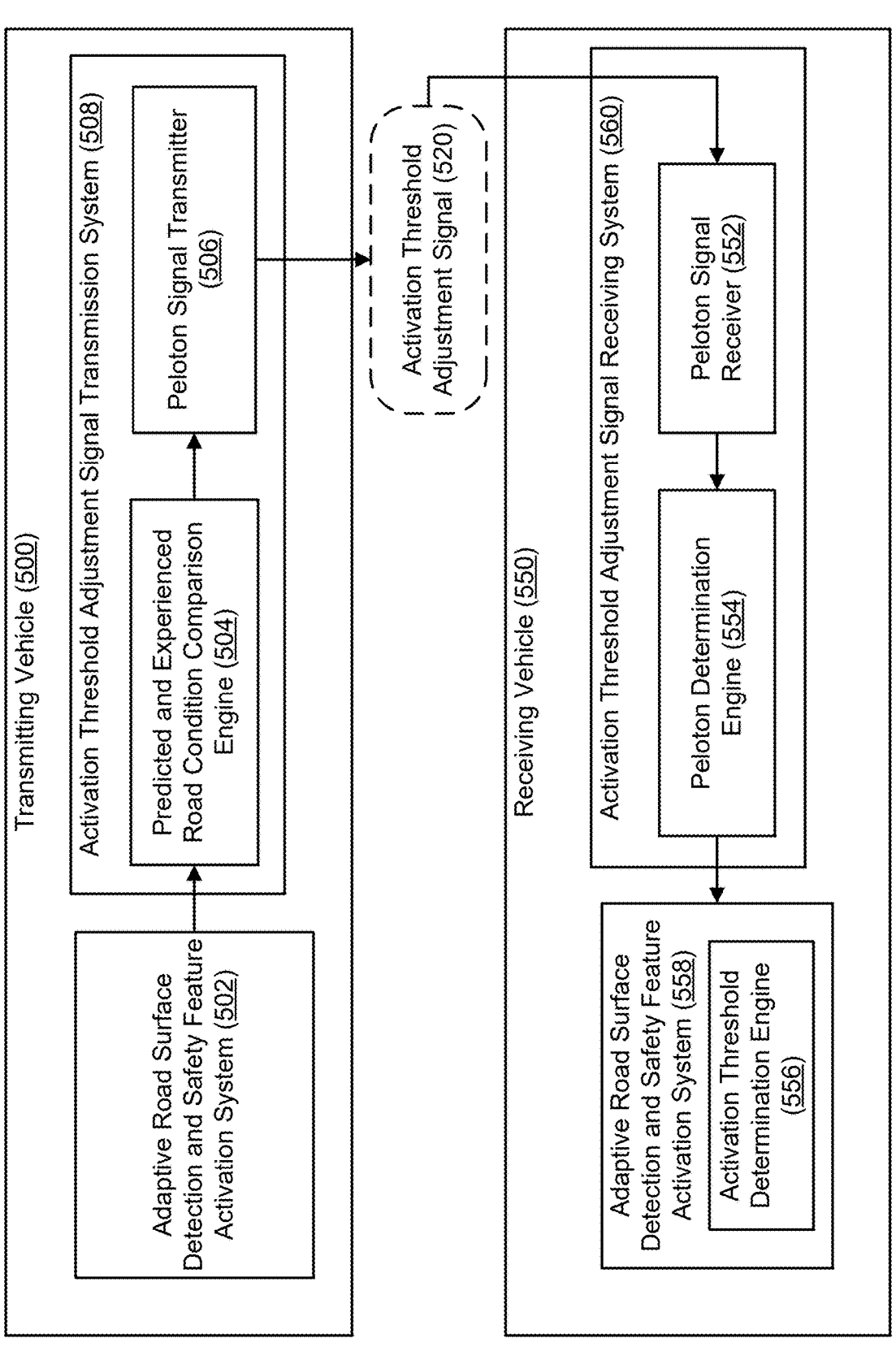
FIG. 5 illustrates an embodiment of an environment in which peloton-based activation threshold adjustment is performed.

FIG. 5 illustrates an embodiment of an environment in which peloton-based activation threshold adjustment is performed.

In the example of FIG. 5, a transmitting vehicle 500 is running a locally deployed instance of the adaptive road surface detection and safety feature activation system (502), embodiments of which are described above. For example, adaptive road surface detection and safety feature activation system 502 is an example instance of adaptive road surface detection and safety feature activation system 100 that is deployed and running on the transmitting vehicle 500.

As described above, in some embodiments, the transmitting vehicle is configured to transmit the activation threshold adjustment signal in response to (or is otherwise triggered by) detecting that actual slippage was different from the anticipated slippage (and that the actual, physical sensor-based road condition score was different from the image-based anticipated road condition score).

In this example, the transmitting vehicle 500 includes activation threshold adjustment signal transmission system 508. In this example, transmission system 508 further includes predicted and experienced road condition comparison engine 504 and peloton signal transmitter 506. In this example, the functionality to transmit peloton-based activation threshold adjustment signals is enabled when it is determined that the transmitting vehicle is in a dense environment.

In some embodiments, predicted and experienced road condition comparison engine 504 is configured to make comparisons and detect such discrepancies or mismatches between image-based road condition predictions and actual conditions as detected by physical sensors (e.g., accelerometers and/or pressure sensors). As one example, engine 504 receives an image-based road surface condition score for an upcoming portion of road (e.g., from system 502). Engine 504 also obtains the physical sensor-based road surface condition score for the same upcoming portion of road (e.g., from system 502). In some embodiments, the physical sensor-based road condition score is generated using physical sensor data that is correlated, using the techniques described above, with the portion of road for which the image-based condition prediction was made.

In response to detecting a discrepancy between predicted and experienced road conditions, peloton signal transmitter 506 is configured to transmit an activation threshold adjustment signal. That is, the activation threshold adjustment signal is transmitted when the reality of slippage did not meet expected slippage. For example, suppose a certain amount of slippage had been anticipated by the camera-based model, but what actually occurred was that there was more slippage than anticipated (as reflected also by an actual, corresponding physical sensor-based road condition score). In that case, for the transmitting vehicle, it would have been more accurate if the perception or image-based model had generated a road condition score that reflected or anticipated higher slippage levels. In this case, with actual slippage being greater than predicted slippage, the adjustment signal includes a signal to decrement the activation threshold.

A message to adjust activation thresholds is then transmitted in response for the benefit of other vehicles that have local instances of the same perception model—while the local instances of the perception model are not changed (and are thus likely to predict the same or similar image-based road condition scores), sensitivity of those vehicles to slippage and safety can be improved by adjusting the other vehicles' activation thresholds (e.g., by lowering their activation thresholds in the above example in which experienced slippage was greater than image-predicted slippage). In other embodiments, the adjustment signal can include a signal to increase activation thresholds in response to determining that actual slippage is less than image-predicted slippage, thereby reducing oversensitivity of activation of vehicle systems to image-based predictions of road conditions.

In some embodiments, transmitting an activation threshold adjustment signal includes broadcasting the activation threshold adjustment signal. In some embodiments, it is then up to receiving vehicles (e.g., that are within a range of, and capable of receiving signals from the transmitting signal) to determine whether to accept or ignore the broadcast activation threshold adjustment signal.

In some embodiments, the activation threshold adjustment signal (520) is broadcast wirelessly. In some embodiments, the activation threshold adjustment signal includes a signal that, if accepted by a receiving vehicle in a threshold or certain proximity, causes the activation threshold of the receiving vehicle to be adjusted accordingly (e.g., decremented or incremented). In some embodiments, transmitting the activation threshold adjustment signal includes transmitting additional metadata, including, without limitation, time (e.g., timestamp of sending of signal), geolocation (e.g., GPS or latitude/longitude coordinates of where the transmitting vehicle was when transmitting the signal), and an activation threshold level.

In the example of FIG. 5, receiving vehicle 550 has activated, based on environmental density, peloton-based functionality, such as that provided by activation threshold adjustment signal receiving system 560, and is listening for activation threshold adjustment signals. In this example, receiving system 560 includes peloton signal receiver 552 and peloton determination engine 554. In this example, peloton signal receiver 552 listens to, scans for, or monitors for activation threshold adjustment signals. In this example, the peloton signal receiver detects activation threshold adjustment signal 520 transmitted by transmitting vehicle 500.

In this example, the receiving vehicle determines whether to accept the signal to adjust its own local activation threshold (e.g., decrement or increment its local activation threshold to a level specified in the received activation threshold adjustment signal). In some embodiments, the determination of whether the receiving vehicle accepts the signal is based on a determination of whether the receiving vehicle and the transmitting vehicle are within a peloton. In this example, peloton determination engine 554 is configured to determine whether the receiving vehicle and the transmitting vehicle that transmitted the activation threshold adjustment signal (picked up by the receiving vehicle) are within a peloton.

In some embodiments, the determination of whether the receiving and the transmitting vehicles are in a peloton is based on a determination of whether the receiving and transmitting vehicles are within a threshold proximity or distance or radius of each other. In some embodiments, if the receiving vehicle and the transmitting vehicle are determined to not be within a threshold proximity of each other (e.g., as determined based on the geolocation data and/or temporal data associated with the received signal), indicating that the receiving and transmitting vehicles are not within a same peloton, then the receiving vehicle ignores, or otherwise does not accept the activation threshold adjustment signal, and does not adjust its activation threshold according to the detected signal.

In some embodiments, if the receiving vehicle is determined to be within a same peloton with the transmitting vehicle (e.g., are within a threshold proximity of each other), then the receiving vehicle accepts the signal and adjusts (e.g., decrements or increments) its own safety system activation threshold according to the signal transmitted by the transmitting vehicle. For example, receiving vehicle 550 is running its own locally deployed instance of the adaptive road surface detection and safety feature activation system, embodiments of which are described above. For example, adaptive road surface detection and safety feature activation system 558 is an example instance of adaptive road surface detection and safety feature activation system 100 that is deployed and running on the receiving vehicle 550. In this example, in response to accepting the activation threshold adjustment signal (based on determining that the transmitting and receiving vehicle are within a threshold proximity of each other), the activation threshold determination engine 556 of system 558 adjusts the activation threshold for pre-emptively activating vehicle safety systems.

While the peloton-based transmitting and receiving functionality has been shown, for illustrative purposes, across two separate vehicles, in some embodiments, a single vehicle includes both the peloton-based transmitting and receiving functionality described herein.

Figure 6A:
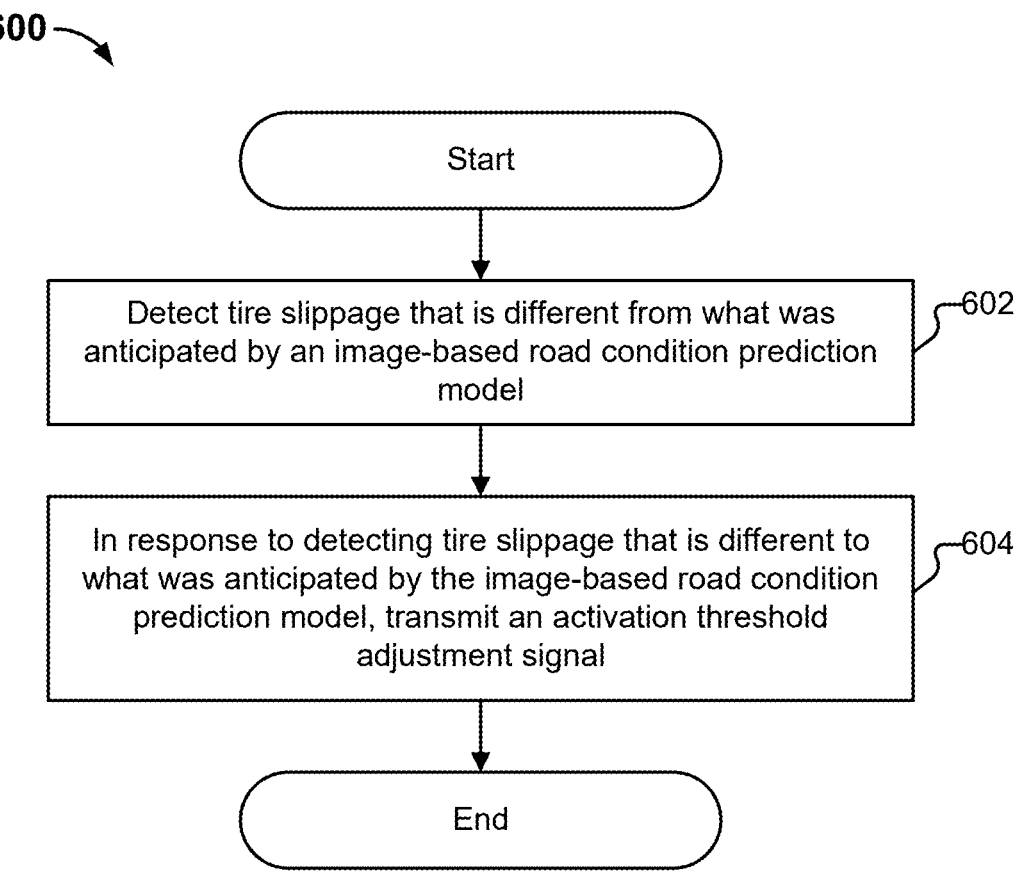
FIG. 6A is a flow diagram illustrating an embodiment of a process for determining whether to transmit an activation threshold adjustment signal.

FIG. 6A is a flow diagram illustrating an embodiment of a process for determining whether to transmit an activation threshold adjustment signal. In some embodiments, process 600 is executed by activation threshold adjustment signal transmission system 508. The process begins at 602, when actual tire slippage that is different from what was anticipated by an image-based road condition prediction model is detected. For example, it can be determined that actual tire slippage was more than what was anticipated by the image-based road condition prediction model, or that actual tire slippage was less than what was anticipated by the image-based road condition prediction model.

At 604, in response to detecting tire slippage that was unanticipated by the image-based road condition prediction model, an activation threshold adjustment signal is transmitted. In some embodiments, transmitting the signal includes broadcasting the signal. In some embodiments, the signal is a signal to adjust an activation threshold for activating vehicle safety features. For example, if actual tire slippage is more than was anticipated by the image-based road condition prediction model, then the adjustment signal that is transmitted is a signal to lower activation thresholds. In some embodiments, transmitting of the activation threshold adjustment signal is reported to a remote entity. In some embodiments, the transmitting of the signal is performed based on a determination that a vehicle for which the tire slippage was occurred is in a dense environment.

FIG. 6B is a flow diagram illustrating an embodiment of a process for determining whether to accept a received activation threshold adjustment signal. In some embodiments, process 650 is executed by activation threshold adjustment signal receiving system 560. The process begins at 652, when an activation threshold adjustment signal transmitted by a transmitting vehicle is received by a receiving vehicle.

At 654, it is determined that the receiving vehicle is within a peloton including the transmitting vehicle. In some embodiments, determining that the receiving vehicle is within a peloton including the transmitting vehicle includes determining whether the receiving vehicle and the transmitting vehicle are within a threshold proximity of each other. Such a determination may be based on GPS (Global Positioning System) data included in the transmitted signal.

At 656, based at least in part on determining that the receiving vehicle is within the peloton including the transmitting vehicle, a local threshold for activating one or more vehicle safety features of the receiving vehicle is adjusted according to the received activation threshold adjustment signal. In some embodiments, adjusting the local threshold includes incrementing or decrementing a threshold road condition score for activating a vehicle safety feature.

Further details regarding peloton-based activation threshold adjustment are described above.

Embodiments of the adaptive road surface detection and safety feature activation system described herein provide image-based assessment of anticipated road surface conditions with respect to likelihood of traction reduction using models trained on physical sensor data. Traction refers to the grip or friction between the road surface and an object, such as a tire of a vehicle, that is moving over the road surface. The amount of traction between the road surface and the tires is dependent in part on the conditions of the road surface. Using the techniques described herein, conditions of the road surface are scored or rated with respect to their proneness to, or impact on, or effect on traction (e.g., how road surface conditions identified from images affect tire slippage).

Embodiments of the image-based road condition prediction and vehicle safety systems activation techniques described herein provide increased safety in a variety of contexts and scenarios. For example, the techniques described herein improve safety in emergent weather conditions, such as when there are progressive weather conditions, and there is ambiguity in an emergent condition. The evaluation of camera data using the techniques described herein can be used to determine whether actions should be taken in such emergent, ambiguous conditions in which there may be changes in the environment.

One example of such a condition is when the ego vehicle is traveling in an environment where there is slush and snow, but it has not yet iced over. However, there may be a change in temperature when the ice suddenly becomes emergent. That is, there is a situation in which the road surface was slushy and somewhat icy, but now the temperature has changed and the road surface conditions are also changed, with the emergence of ice. The camera-based system described herein anticipates the upcoming road condition to pre-emptively activate safety systems so that the driver is not caught off guard due to such variable conditions. This is an improvement over existing systems which are not anticipatory to what is upcoming, but instead react to what is going on beneath the tires. Using the anticipatory techniques described herein, adverse events can be avoided by pre-emptively activating systems based on evaluation of upcoming road conditions.

Providing image-based road condition prediction and pre-emptive driver notification and vehicle safety systems activation can also help to reduce accidents by changing the way that drivers react to situations by making them calmer, preventing them from overcorrection when adverse situations arise. For example, using the techniques described herein, startling of drivers is reduced, which reduces overcorrection, such as sudden stomping on the brakes or sharp turning of the wheel, which can also be a source of danger.

For example, the system described herein can warn the driver and pre-tension the vehicle based on what the camera has observed or perceived of upcoming road conditions. As one example, instead of the driver only finding out loss of traction due to the wheel suddenly moving jerkily, the driver is pre-emptively alerted or prompted ahead of time (e.g., via a haptic or audio or visual alert), and vehicle systems are also pre-emptively activated. With such pre-emptive action, vehicular accidents can be avoided. Further, pre-emptive alerting allows the driver to be prepared or aware of what is upcoming, reducing overcorrection (and sudden movements) from the driver, with vehicle safety systems already pre-emptively activated to support the driver in avoiding adverse events. For example, rather than providing alerts or activating systems after actual loss of traction has already occurred, the pre-emptive system described herein pre-emptively activates vehicle safety systems based on evaluation of images of the upcoming road surface and predicting a risk of upcoming slippage, prior to the actual occurrence of slippage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a memory; and one or more processors coupled to the memory and configured to:

receive an image captured by a camera, the image comprising a road surface ahead of a vehicle;

provide the image to an image-based road surface condition prediction model that is trained at least in part using physically-sensed traction data; and pre-emptively activate one or more safety-related features of the vehicle based at least in part on an anticipated condition of the road surface predicted by the image-based road surface condition prediction model, wherein:

the anticipated condition of the road surface is represented via a road condition score:

pre-emptively activating the one or more safety-related features is based at least in part on comparing the road condition score to an activation threshold;

the activation threshold comprises a threshold road condition score that triggers activation of the one or more safety-related features; and the activation threshold is dynamically adjustable based at least in part on a density of objects proximate to the vehicle.

2. The system of claim 1, wherein predicting of the anticipated condition of the road surface by the image-based road surface condition prediction model includes assigning a slippage risk score for a road surface pixel in the image.

3. The system of claim 1, wherein the one or more processors are further configured to use physical sensor data to validate the anticipated condition of the road surface predicted by the image-based road surface condition prediction model.

4. The system of claim 3, wherein the physical sensor data comprises a real-time pressure gradient.

5. The system of claim 4, wherein the real-time pressure gradient is determined using pressure data collected using a tire-integrated micro-pressure sensor array.

6. The system of claim 4, wherein hydroplaning is detected based at least in part on identifying a pattern of non-uniform pressure distribution.

7. The system of claim 3, wherein the physical sensor data comprises accelerometer data.

8. The system of claim 7, wherein the one or more processors are configured to detect un-commanded vehicle motion using the accelerometer data.

9. A method, comprising:

receiving an image captured by a camera, the image comprising a road surface ahead of a vehicle;

providing the image to an image-based road surface condition prediction model that is trained at least in part using physically-sensed traction data; and pre-emptively activating one or more safety-related features of the vehicle based at least in part on an anticipated condition of the road surface predicted by the image-based road surface condition prediction model, wherein:

the anticipated condition of the road surface is represented via a road condition score;

pre-emptively activating the one or more safety-related features is based at least in part on comparing the road condition score to an activation threshold;

the activation threshold comprises a threshold road condition score that triggers activation of the one or more safety-related features; and the activation threshold is dynamically adjustable based at least in part on a density of objects proximate to the vehicle.

10. The method of claim 9, wherein predicting of the anticipated condition of the road surface by the image-based road surface condition prediction model includes assigning a slippage risk score for a road surface pixel in the image.

11. The method of claim 9, further comprising using physical sensor data to validate the anticipated condition of the road surface predicted by the image-based road surface condition prediction model.

12. The method of claim 11, wherein the physical sensor data comprises a real-time pressure gradient.

13. The method of claim 12, wherein the real-time pressure gradient is determined using pressure data collected using a tire-integrated micro-pressure sensor array.

14. The method of claim 12, wherein hydroplaning is detected based at least in part on identifying a pattern of non-uniform pressure distribution.

15. The method of claim 11, wherein the physical sensor data comprises accelerometer data.

16. The method of claim 15, further comprising detecting un-commanded vehicle motion using the accelerometer data.

* * * * *